United States Patent
Alshina et al.

(10) Patent No.: US 9,571,843 B2
(45) Date of Patent: *Feb. 14, 2017

(54) VIDEO ENCODING METHOD USING OFFSET ADJUSTMENT ACCORDING TO CLASSIFICATION OF PIXELS BY MAXIMUM ENCODING UNITS AND APPARATUS THEREOF, AND VIDEO DECODING METHOD AND APPARATUS THEREOF

(71) Applicant: SAMSUNG ELECTRONICS CO., LTD., Suwon-si (KR)

(72) Inventors: Elena Alshina, Suwon-si (KR); Alexander Alshin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 184 days.

This patent is subject to a terminal disclaimer.

(21) Appl. No.: 14/368,136

(22) PCT Filed: Dec. 21, 2012

(86) PCT No.: PCT/KR2012/011275
§ 371 (c)(1),
(2) Date: Jun. 23, 2014

(87) PCT Pub. No.: WO2013/095047
PCT Pub. Date: Jun. 27, 2013

(65) Prior Publication Data
US 2014/0369420 A1   Dec. 18, 2014

Related U.S. Application Data

(60) Provisional application No. 61/579,389, filed on Dec. 22, 2011.

(51) Int. Cl.
H04N 19/70 (2014.01)
H04N 19/176 (2014.01)
(Continued)

(52) U.S. Cl.
CPC ......... H04N 19/176 (2014.11); H04N 19/117 (2014.11); H04N 19/136 (2014.11);
(Continued)

(58) Field of Classification Search
CPC .................. H04N 19/00533; H04N 19/117
(Continued)

(56) References Cited

U.S. PATENT DOCUMENTS 9,386,322 B2   7/2016   Hayase et al.
2011/0194613 A1   8/2011   Chen et al.
(Continued)

FOREIGN PATENT DOCUMENTS

EP   2 262 267 A1   12/2010
KR   10-2011-0111852 A   10/2011
(Continued)

OTHER PUBLICATIONS

Zhao, et al.; "Fast Mode Decision Algorithm for Intra Prediction in HEVC", Visual Communications and Image Processing (VCIP), IEEE, Nov. 2011, 4 pages total.
(Continued)

Primary Examiner — Tung Vo
Assistant Examiner — Rowina Cattungal
(74) Attorney, Agent, or Firm — Sughrue Mion, PLLC

(57) ABSTRACT

A video decoding method includes extracting offset mergence information of a current largest coding unit (LCU), the offset mergence information indicating whether to adopt a second offset parameter as a first offset parameter of the current LCU; reconstructing the first offset parameter of the current LCU based on the offset mergence information, the
(Continued)

first offset parameter including an offset type, an offset value, and an offset class of the current LCU; determining whether the current LCU is an edge type or a band type, based on the offset type; determining an edge direction according to the edge type or a band range according to the band type, based on the offset class; determining a difference value between reconstructed pixels and original pixels included in the offset class, based on the offset value; and adjusting pixel values of reconstructed pixels based on the difference value.

1 Claim, 23 Drawing Sheets

(51) Int. Cl.
| | | |
|---|---|---|
| H04N 19/117 | (2014.01) | |
| H04N 19/463 | (2014.01) | |
| H04N 19/14 | (2014.01) | |
| H04N 19/182 | (2014.01) | |
| H04N 19/82 | (2014.01) | |
| H04N 19/96 | (2014.01) | |
| H04N 19/186 | (2014.01) | |
| H04N 19/65 | (2014.01) | |
| H04N 19/136 | (2014.01) | |

(52) U.S. Cl.
CPC ........... *H04N 19/14* (2014.11); *H04N 19/182* (2014.11); *H04N 19/186* (2014.11); *H04N 19/463* (2014.11); *H04N 19/65* (2014.11); *H04N 19/82* (2014.11); *H04N 19/96* (2014.11)

(58) Field of Classification Search
USPC .................................................. 375/240.25
See application file for complete search history.

(56) References Cited

U.S. PATENT DOCUMENTS

| | | | |
|---|---|---|---|
| 2011/0243248 A1 | 10/2011 | Ashin et al. | |
| 2011/0274158 A1 | 11/2011 | Fu et al. | |
| 2011/0305274 A1 | 12/2011 | Fu et al. | |
| 2011/0305277 A1 | 12/2011 | Fu et al. | |
| 2012/0287988 A1 | 11/2012 | Chong et al. | |
| 2012/0294353 A1* | 11/2012 | Fu ..................... | H04N 19/70 375/240.02 |
| 2013/0051454 A1* | 2/2013 | Sze ..................... | H04N 19/70 375/240.02 |
| 2014/0192891 A1 | 7/2014 | Alshina et al. | |
| 2015/0163502 A1 | 6/2015 | Alshina et al. | |

FOREIGN PATENT DOCUMENTS

| | | |
|---|---|---|
| KR | 10-1457398 B1 | 11/2014 |
| RU | 2434359 C2 | 11/2011 |
| TW | 201130311 A1 | 9/2011 |
| WO | 2012/154576 A2 | 11/2012 |

OTHER PUBLICATIONS

Han, et al.; "Improved Video Compression Efficiency Through Flexible Unit Representation and Corresponding Extension of Coding Tools", IEEE Transactions on Circuits and Systems for Video Technology, Dec. 2010, vol. 20, No. 12, 12 pages total.
Teng, et al.; "Fast Mode Decision Algorithm for Residual Quadtree Coding in HEVC", Visual Communications and Image Processing (VCIP), IEEE, Nov. 2011, 4 pages total.
Minoo, et al.; "Coding of SAO Merge Left and Merge Up Flags", Joint Collaborative Team on Video Coding (JCT-VC) of ITU-T SG16 WP3 and ISO/IEC JTC1/SC29/WG11, Jul. 2012, 7 pages total.
Minoo, et al.; "Non-CE1: Coding of SAO Merge Left and Merge Up", Joint Collaborative Team on Video Coding (JCT-VC) of ITU-T SG16 WP3 and ISO/IEC JTC1/SC29/WG11, May 2012, 7 pages total.
Communication dated Sep. 10, 2015, issued by the Taiwanese Intellectual Property Office in counterpart Taiwanese Application No. 104121571.
Communication dated Nov. 25, 2015, issued by the European Patent Office in counterpart European Application No. 15175906.5.
Communication dated Nov. 24, 2015, issued by the European Patent Office in counterpart European Application No. 15175900.8.
Communication dated Nov. 12, 2015 issued by Australian Intellectual Property Office in counterpart Australian Patent Application No. 2015202633.
Communication dated Nov. 12, 2015 issued by Australian Intellectual Property Office in counterpart Australian Patent Application No. 2015202636.
Communication dated Dec. 11, 2014 issued by the Korean Intellectual Property Office in counterpart Korean Patent Application No. 10-2012-0150933.
"Test Model Under Consideration"; Joint Collaborative Team on Video Coding (JCT-VC) of ITU-T SG16 WP3 and ISO/IEC JTC1/SC29/WG11; Apr. 23, 2010; 113 pages total.
Communication dated Feb. 17, 2015 issued by the Australian Government IP Australia in counterpart Australian Patent Application No. 2012354420.
Fu, et al.; "Sample Adaptive Offset for HEVC", Multimedia Signal Processing, 2011 IEEE 13th International Workshop on IEEE, Oct. 2011, 5 pages total.
Chen, et al.; "Non-CE8: Sample Adaptive Offset with LCU-Based Syntax", Joint Collaborative Team on Video Coding (JCT-VC) of ITU-T SG16 WP3 and ISO/IEC JTC1/SC29/WG11, Nov. 2011, 6 pages total.
Fu, et al.; "Non-CE8: Offset Coding in SAO", Joint Collaborative Team on Video Coding (JCT-VC) of ITU-T SG16 WP3 and ISO/IEC JTC1/SC29/WG11, Nov. 2011, 5 pages total.
Fu, et al.; "Sample Adaptive Offset with LCU-Based Syntax", Joint Collaborative Team on Video Coding (JCT-VC) of ITU-T SG16 WP3 and ISO/IEC JTC1/SC29/WG11, Jul. 2011, 6 pages total.
McCann, et al.; "HM4: High Efficiency Video Coding (HEVC) Test Model 4 Encoder Description", Joint Collaborative Team on Video Coding (JCT-VC) of ITU-T SG16 WP3 and ISO/IEC JTC1/SC29/WG11, Jul. 2011, 36 pages total.
Fu, et al.; "Sample Adaptive Offset in the HEVC Standard", IEEE Transaction on Circuits and Systems for Video Technology, Dec. 2012, vol. 22, No. 12, 10 pages total.
Yamazaki, et al.; "Improvement of Sample Adaptive Offset with Modified Bit Accuracy and Restricted Offsets", Joint Collaborative Team on Video Coding (JCT-VC) of ITU-T SG16 WP3 and ISO/IEC JTC1/SC29/WG11, Jul. 2011, 6 pages total.
Fu, et al.; "Sample Adaptive Offset for Chroma", Joint Collaborative Team on Video Coding (JCT-VC) of ITU-T SG16 WP3 and ISO/IEC JTC1/SC29/WG11, Jul. 2011, 5 pages total.
Fu, et al.; "CE13: Sample Adaptive Offset with LCU-Independent Decoding", Joint Collaborative Team on Video Coding (JCT-VC) of ITU-T SG16 WP3 and ISO/IEC JTC1/SC29/WG11, Mar. 2011, 6 pages total.
Communication dated Jun. 16, 2015, issued by the European Patent Office in counterpart European Application No. 12859756.4.
Communication dated Jul. 15, 2015, issued by the Canadian Intellectual Property Office in counterpart Canadian Application No. 2,860,248.
Communication dated Jul. 14, 2015, issued by the Japanese Patent Office in counterpart Japanese Application No. 2014-548676.
Communication dated Aug. 11, 2015, issued by the Japanese Patent Office in counterpart Japanese Application No. 2015-139036.
Communication dated Aug. 24, 2015, issued by the Korean Intellectual Property Office in counterpart Korean Application No. 10-2014-0148747.
Communication dated Aug. 24, 2015, issued by the Korean Intellectual Property Office in counterpart Korean Application No. 10-2015-0034531.

(56) References Cited

OTHER PUBLICATIONS

Communication dated Aug. 24, 2015, issued by the Korean Intellectual Property Office in counterpart Korean Application No. 10-2015-0034532.

Communication dated Aug. 24, 2015, issued by the Korean Intellectual Property Office in counterpart Korean Application No. 10-2015-0034533.

Written Opinion date Apr. 19, 2013 issued by the International Searching Authority, in counterpart International Application No. PCT/KR2012/011275.

International Search Report date Apr. 19, 2013 issued by the International Searching Authority, in counterpart International Application No. PCT/KR2012/011275.

Chih Ming et al. "CE8 Subtest3: Picture Quadtree Adaptive Offset";Joint Collaborative Team on Video Coding (JCT-VC) 4th Meeting: Daegu, KR, Jan. 20-28, 2011; JCTVC-D122; 10 pages total.

McCann, Ken et al., "Samsung's Response to the Call for Proposals on Video Compression Technology", Joint Collaborative Team on Video Coding (JCT-VC); $1^{st}$ meeting : Dresden, DE, Apr. 15-23, 2010; JCTVC-A124; 40 pages total.

Yang, Jeong Yeop et al.;"In-Loop Filtering in HEVC"; Journal of IEEk, vol. 38 No. 8; Aug. 2011; 10 pages total.

Communication dated Jan. 29, 2016 issued by the Taiwanese Patent Office in counterpart Taiwanese Patent Application No. 101149289.

Communication dated Apr. 14, 2016 issued by the European Patent Office in counterpart European Patent Application No. 12859756.4.

Woo-Shik Kim, et al; "Non-CE8: Method of visual coding artifact removal for SAO"; Joint Collaborative Team on Video Coding (JCT-VC) of ITU-T SG16 WP3 and ISO/IEC JTC1/SC29/WG11; 7th Meeting: Nov. 21-30, 2011; Document: JCTVC-G680; pp. 1-7.

Communication issued Sep. 27, 2016, issued by the Federal Service for Intellectual Property in counterpart Russian Patent Application No. 2014130014.

* cited by examiner

| CATEGORY | CONDITION |
|---|---|
| 1 | Xc < Xa && Xc < Xb |
| 2 | (Xc < Xa && Xc == Xb)\|\|(Xc == Xa && Xc < Xb) |
| 3 | ( Xc > Xa && Xc == Xb)\|\|(Xc == Xa && Xc > Xb) |
| 4 | Xc > Xa && Xc > Xb |
| 0 | IF CONDITIONS FOR CATEGORIES 1, 2, 3, AND 4 ARE NOT SATISFIED |

CODING UNIT (1010)

PREDICTION UNIT (1060)

VIDEO ENCODING METHOD USING OFFSET ADJUSTMENT ACCORDING TO CLASSIFICATION OF PIXELS BY MAXIMUM ENCODING UNITS AND APPARATUS THEREOF, AND VIDEO DECODING METHOD AND APPARATUS THEREOF

CROSS-REFERENCE TO RELATED APPLICATIONS

This application is a National Stage Entry of PCT/KR2012/011275, filed on Dec. 21, 2012, which claims priority to U.S. provisional patent application No. 61/579,389, filed on Dec. 22, 2011 in the U.S. Patent and Trademark Office, the entire disclosure of which is incorporated herein by reference in its entirety.

TECHNICAL FIELD

The exemplary embodiments relate to video encoding and decoding for minimizing an error between an original image and a reconstructed image.

DESCRIPTION OF THE RELATED ART

As hardware for reproducing and storing high resolution or high quality video content is being developed and supplied, a need for a video codec for effectively encoding or decoding the high resolution or high quality video content is increasing. According to a conventional video codec, a video is encoded according to a limited encoding method based on a macroblock having a predetermined size.

Image data of the space domain is transformed into coefficients of the frequency domain via frequency transformation. According to a video codec, an image is split into blocks having a predetermined size, discrete cosine transformation (DCT) is performed on each block, and frequency coefficients are encoded in block units, for rapid calculation of frequency transformation. Compared with image data of the space domain, coefficients of the frequency domain are easily compressed. In particular, since an image pixel value of the space domain is expressed according to a prediction error via inter prediction or intra prediction of a video codec, when frequency transformation is performed on the prediction error, a large amount of data may be transformed to 0. According to a video codec, an amount of data may be reduced by replacing data that is consecutively and repeatedly generated with small-sized data.

SUMMARY

The exemplary embodiments provide a video encoding method and apparatus, and a video decoding method and apparatus for generating a reconstructed image having a minimized error between an original image and the reconstructed image.

According to an aspect of an exemplary embodiment, there is provided an offset adjustment method for video encoding, the method including encoding a current largest coding unit (LCU) from among LCUs of a video based on coding units split from the current LCU and having a tree structure; determining a first offset parameter of the current LCU, the first offset parameter including an offset type indicating whether a pixel value classification method of the current LCU is an edge type or a band type, an offset class indicating an edge direction according to the edge type or a band range according to the band type, and an offset value indicating a difference value between reconstructed pixels and original pixels included in the offset class; and outputting offset mergence information of the current LCU, the offset mergence information indicating whether to adopt a second offset parameter of a left LCU or an upper LCU adjacent to the current LCU as the first offset parameter based on sameness between the first offset parameter and the second offset parameter. The method further includes, if the second offset parameter is not adopted as the first offset parameter, outputting the first offset parameter including the offset type, the offset value, and the offset class, which are followed by the offset mergence information of the current LCU.

The outputting of the first offset parameter may include outputting an off type indicating whether to apply an offset adjustment technique to the current LCU, as the offset type, and the method may further include, if the offset adjustment technique is applied to the current LCU, outputting other offset parameters.

According to another aspect of an exemplary embodiment, there is provided an offset adjustment method for video decoding, the method including extracting offset mergence information of a current largest coding unit (LCU) from among LCUs of a video from a received bitstream, the offset mergence information indicating whether to adopt a second offset parameter of a left LCU or an upper LCU adjacent to the current LCU as a first offset parameter of the current LCU; reconstructing the first offset parameter of the current LCU based on the offset mergence information, the first offset parameter including an offset type, an offset value, and an offset class of the current LCU; determining whether a pixel value classification method of the current LCU is an edge type or a band type, based on the offset type; determining an edge direction according to the edge type or a band range according to the band type, based on the offset class; determining a difference value between reconstructed pixels and original pixels included in the offset class, based on the offset value; and adjusting pixel values of reconstructed pixels reconstructed based on coding units split from the current LCU and having a tree structure, by the difference value.

The determining of whether the pixel value classification method of the current LCU is the edge type or the band type may further include extracting an off type indicating whether an offset adjustment technique is applied to the current LCU, based on the offset type; and, if the offset adjustment technique is applied to the current LCU based on the extracted off type, extracting other offset parameters.

The reconstructing of the first offset parameter may include determining offset values corresponding to a predetermined number of categories, and each of the offset parameters may be greater than or equal to a preset minimum value and may be less than or equal to a preset maximum value.

The determining of the edge direction or the band range may include, if the offset type is the edge type, determining a direction of an edge formed between a current reconstructed pixel and adjacent reconstructed pixels included in the current LCU as 0°, 90°, 45°, or 135°, based on the offset class.

The determining of the edge direction or the band range may include, if the offset type is the band type, determining a position of a band to which the pixel values of the reconstructed pixels belong from among a plurality of bands obtained by dividing a total range of the pixel values, based on the offset class.

The determining of the difference value may further include, if the offset type is the band type, determining whether the offset value is 0, based on zero value information of the offset value, and the method may further include, if the zero value information indicates that the offset value is not 0, determining whether the offset value is a positive number or a negative number based on sign information of the offset value, the sign information being followed by the zero value information, and reconstructing a remainder followed by the sign information.

The determining of the difference value may further include, if the offset type is the edge type, determining whether the offset value is 0, based on zero value information of the offset value, and the method may further include, if the zero value information indicates that the offset value is not 0, reconstructing a remainder of the offset value, the remainder being followed by the zero value information.

The reconstructing of the first offset parameter may include, if the second offset parameter of the left LCU or the upper LCU is adopted as the first offset parameter based on the offset mergence information, not extracting the first offset parameter of the current LCU and reconstructing the first offset parameter to be the same as the second offset parameter; and, if the second offset parameter of the left LCU or the upper LCU is not adopted as the first offset parameter based on the offset mergence information, extracting and reconstructing the first offset parameter followed by the offset mergence information from the received bitstream.

The reconstructing of the first offset parameter may include reconstructing an offset parameter of a luma component, an offset parameter of a first chroma component, and an offset parameter of a second chroma component by using common offset mergence information of the current LCU.

The reconstructing of the first offset parameter may include reconstructing an offset type commonly applied to a first chroma component and a second chroma component of the current LCU.

According to another aspect of the present invention, there is provided a video encoding apparatus for offset adjustment, the apparatus including an encoder configured to encode a current largest coding unit (LCU) from among LCUs of a video based on coding units split from the current LCU and having a tree structure; an offset parameter determiner configured to determine a first offset parameter of the current LCU, the first offset parameter including an offset type indicating whether a pixel value classification method of the current LCU is an edge type or a band type, an offset class indicating an edge direction according to the edge type or a band range according to the band type, and an offset value indicating a difference value between reconstructed pixels and original pixels included in the offset class; and an offset parameter outputter configured to output offset mergence information of the current LCU, the offset mergence information indicating whether to adopt a second offset parameter of a left or upper LCU adjacent to the current LCU as the first offset parameter based on sameness between the first offset parameter and the second offset parameter. If the second offset parameter is not adopted as the first offset parameter, the offset parameter outputter is configured to output the first offset parameter including the offset type, the offset value, and the offset class, which are followed by the offset mergence information of the current LCU.

According to another aspect of an exemplary embodiment, there is provided a video decoding apparatus for offset adjustment, the apparatus including an offset parameter extractor configured to extract offset mergence information of a current largest coding unit (LCU) from among LCUs of a video from a received bitstream, the offset mergence information indicating whether to adopt a second offset parameter of a left LCU or an upper LCU adjacent to the current LCU as a first offset parameter of the current LCU, and to reconstruct the first offset parameter of the current LCU based on the offset mergence information, the first offset parameter including an offset type, an offset value, and an offset class of the current LCU; an offset determiner configured to determine whether a pixel value classification method of the current LCU is an edge type or a band type, based on the offset type, to determine an edge direction according to the edge type or a band range according to the band type, based on the offset class, and to determine a difference value between reconstructed pixels and original pixels included in the offset class, based on the offset value; and an offset adjuster configured to adjust pixel values of reconstructed pixels reconstructed based on coding units split from the current LCU and having a tree structure, based on the difference value.

According to another aspect of an exemplary embodiment, there is provided a non-transitory computer-readable recording medium having recorded thereon a computer program for executing the offset adjustment method for video encoding.

According to another aspect of an exemplary embodiment, there is provided a computer-readable recording medium having recorded thereon a computer program for executing the offset adjustment method for video decoding.

A video encoding apparatus and a video decoding apparatus using an offset adjustment technique (a sample adaptive offset (SAO) technique), according to various exemplary embodiments, may classify pixel values of each largest coding unit (LCU) according to image characteristics such as an edge type or a band type, may signal an offset value that is an average error value of pixel values having the same characteristics, and may adjust unpredictable pixel values of reconstructed pixels by the offset value, thereby minimizing an error between an original image and a reconstructed image.

DETAILED DESCRIPTION OF THE EXEMPLARY EMBODIMENTS

Hereinafter, a video encoding technique and a video decoding technique using offset adjustment based on pixel classification, according to exemplary embodiments, will be described with reference to FIGS. 1A through 7. Also, offset adjustment based on pixel classification in a video encoding technique and a video decoding technique based on coding units having a tree structure, according to exemplary embodiments, will be described with reference to FIGS. 1A through 20. Hereinafter, an 'image' may denote a still image or a moving image of a video, or a video itself.

A video encoding technique and a video decoding technique using offset adjustment based on pixel classification, according to exemplary embodiments, will now be described with reference to FIGS. 1A through 7.

Figure 1A:
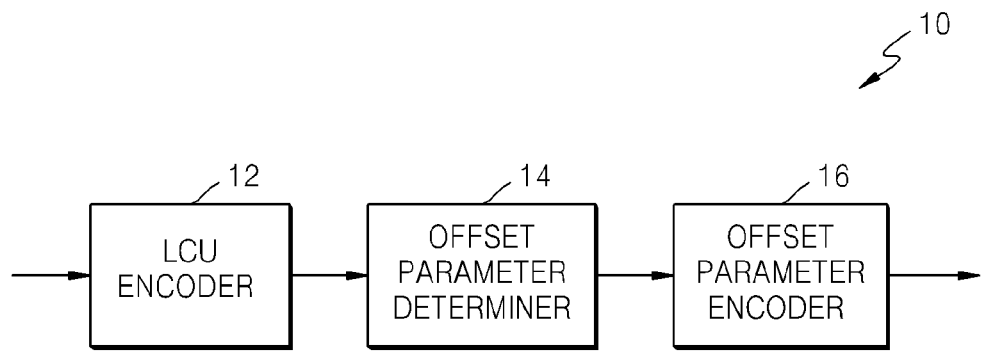
FIGS. 1A and 1B are a block diagram of a video encoding apparatus and a flowchart of an offset adjustment method of the video encoding apparatus, according to an exemplary embodiment.
Figure 1B:
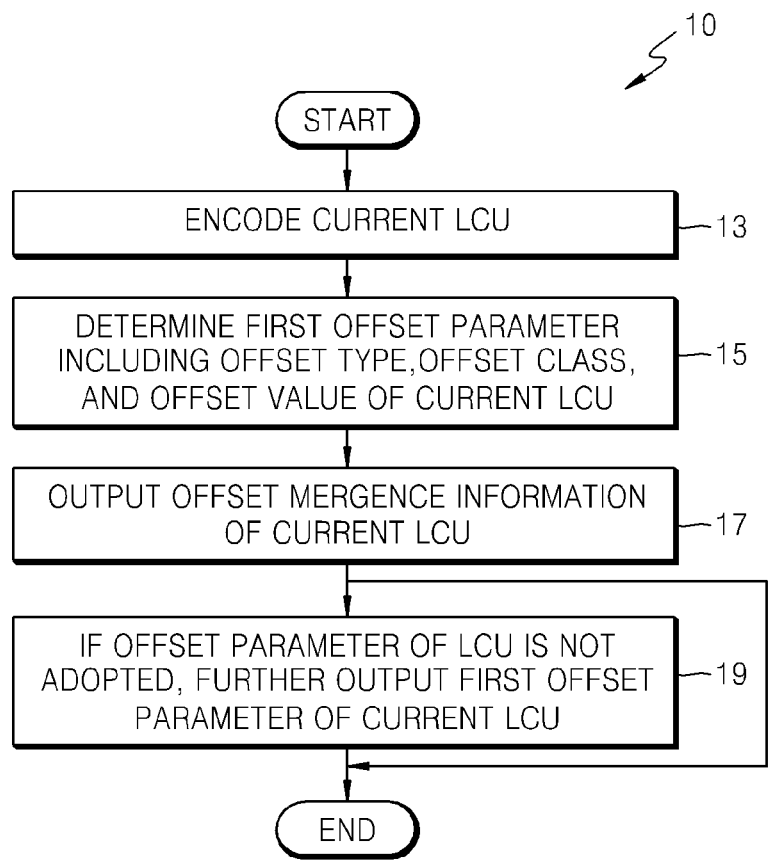

FIGS. 1A and 1B are a block diagram of a video encoding apparatus 10 and a flowchart of an offset adjustment method of the video encoding apparatus 10, according to an exemplary embodiment.

The video encoding apparatus 10 includes a largest coding unit (LCU) encoder 12, an offset parameter determiner 14, and an offset parameter encoder 16.

The video encoding apparatus 10 receives an input of images of a video, splits each image into blocks, and encodes each block. A block may have a square shape, a rectangular shape, or an arbitrary geometrical shape, and is not limited to a data unit having a predetermined size. The block according to an exemplary embodiment may be an LCU or a coding unit among coding units according to a tree structure. Video encoding and decoding methods based on coding units according to a tree structure will be described below with reference to FIGS. 1A through 20.

The video encoding apparatus 10 may receive an input of images of a video, may split each image into LCUs, and may output resultant data generated by performing prediction, transformation, and entropy encoding on samples of each LCU, as a bitstream. Samples of an LCU may be pixel value data of pixels included in the LCU.

The LCU encoder 12 may individually encode LCUs of a picture. The LCU encoder 12 may encode a current LCU based on coding units split from the current LCU and having a tree structure.

In order to encode the current LCU, the LCU encoder 12 may encode samples by performing intra prediction, inter prediction, transformation, and quantization on each of the coding units included in the current LCU and having a tree structure.

The LCU encoder 12 may reconstruct the encoded samples included in the current LCU by performing inverse quantization, inverse transformation, and inter prediction or intra compensation on each of the coding units having a tree structure so as to decode the coding units.

In order to minimize an error between original pixels before the current LCU is encoded and reconstructed pixels after the current LCU is decoded, the video encoding apparatus 10 may determine offset values indicating difference values between the original pixels and the reconstructed pixels.

The offset parameter determiner 14 may determine the offset values with respect to LCUs. Offset parameters including the offset values, an offset type, and an offset class may also be determined with respect to LCUs.

The offset parameter determiner 14 may determine the offset type according to a pixel value classification method of the current LCU. According to an exemplary embodiment, the offset type may be determined as an edge type or a band type. According to a pixel value classification method of a current block, it may be determined whether to classify pixels of the current block according to the edge type or the band type.

If the offset type is the edge type, according to a direction and a shape of edges formed between the reconstructed pixels of the current LCU and their adjacent pixels, an offset between the reconstructed pixels and the original pixels may be determined.

If the offset type is the band type, from among a plurality of bands obtained by dividing a total range of pixel values of the reconstructed pixels of the current LCU, an offset between the reconstructed pixels and the original pixels included in each band may be determined. The bands may be obtained by equally or unequally dividing the total range of the pixel values.

Accordingly, the offset parameter determiner 14 may determine the offset type of the current LCU, which indicates the edge type or the band type, based on spatial characteristics of pixel values of the current LCU.

The offset parameter determiner 14 may determine an offset class of each of the reconstructed pixels according to the offset type of the current LCU. The offset class may be determined as an edge class or a band class.

With respect to the edge type, the edge class may indicate a direction of edges formed between the reconstructed pixels and their adjacent pixels. The edge class may indicate an edge direction of 0°, 90°, 45°, or 135°.

If the offset type is the edge type, the offset parameter determiner 14 may determine the edge class of each of the reconstructed pixels of the current LCU.

With respect to the band type, from among a plurality of bands that are a predetermined number of continuous pixel value periods obtained by dividing a total range of pixel values of the current LCU, the band class may indicate positions of the bands to which pixel values of the reconstructed pixels belong.

For example, with respect to a sample having a pixel value of 8 bits, a total range of the pixel value is from 0 to 255 and the pixel value may be classified into a total of 32 bands. In this case, from among the total of 32 bands, a predetermined number of bands to which pixel values of the reconstructed pixels belong may be determined. The band class may indicate a start position of a predetermined number of continuous bands by using one of the band indices from 0 to 31.

With respect to the edge type, the reconstructed pixels of the current LCU may be classified into a predetermined number of categories according to the shape of edges formed between the reconstructed pixels and their adjacent pixels. For example, according to four edge shapes such as a local valley of a concave edge, a curved corner of a concave edge, a curved corner of a convex edge, and a local peak of a convex edge, the reconstructed pixels may be classified into four categories. According to an edge shape of each of the reconstructed pixels of the current LCU, one of the four categories may be determined.

With respect to the band type, according to positions of bands to which pixel values of the reconstructed pixels of the current LCU belong, the reconstructed pixels may be classified into a predetermined number of categories. For example, according to band indices of four continuous bands from a start band position indicated by the band class, the reconstructed pixels may be classified into four categories. According to one of the four bands, to which each of the reconstructed pixels of the current LCU belongs, one of the four categories may be determined.

The offset parameter determiner 14 may determine a category of each of the reconstructed pixels of the current LCU. With respect to the reconstructed pixels of the current LCU, which belong to the same category, the offset parameter determiner 14 may determine offset values by using difference values between the reconstructed pixels and the original pixels. In each category, an average of the difference values between the reconstructed pixels and the original pixels, e.g., an average error of the reconstructed pixels, may be determined as an offset value corresponding to a current category. The offset parameter determiner 14 may determine an offset value of each category and may determine offset values of all categories as the offset values of the current LCU.

For example, if the offset type of the current LCU is the edge type and the reconstructed pixels are classified into four categories according to edge shapes, or if the offset type of the current LCU is the band type and the reconstructed pixels are classified into four categories according to indices of four continuous bands, the offset parameter determiner 14 may determine four offset values by determining an average error between the reconstructed pixels and the original pixels, which belong to each of the four categories.

Each of the offset values may be greater than or equal to a preset minimum value and may be less than or equal to a preset maximum value.

The offset parameter encoder 16 may encode and output offset parameters including the offset type, the offset class, and the offset values of the current LCU, which are determined by the offset parameter determiner 14.

Offset parameters of each block may include an offset type and offset values of the block. As the offset type, an off type, the edge type, or the band type may be output.

If the offset type is the off type, it may be indicated that offset adjustment is not applied to the current LCU. In this case, other offset parameters of the current LCU do not need to be encoded.

If the offset type is the edge type, the offset parameters may include offset values individually corresponding to edge classes. Also, if the offset type is the band type, the offset parameters may include offset values individually corresponding to bands. That is, the offset parameter encoder 16 may encode offset parameters of each block.

Based on the sameness between a first offset parameter of a current LCU and a second offset parameter of a left or upper LCU adjacent to the current LCU, the offset parameter encoder 16 may output offset mergence information of the current LCU, which indicates whether to adopt the second offset parameter as the first offset parameter of the current LCU.

If the offset parameters of at least one of the left and upper LCUs of the current LCU are the same as those of the current LCU, the offset parameter encoder 16 may not encode the offset parameters of the current LCU and may encode only the offset mergence information. In this case, offset mergence information indicating that the offset parameters of the left or upper LCU are adopted as the offset parameters of the current LCU may be output.

If the offset parameters of the left and upper LCUs are different from the offset parameters of the current LCU, the offset parameter encoder 16 may encode the offset mergence information and the offset parameters of the current LCU. In this case, offset mergence information indicating that the offset parameters of the left or upper LCU are not adopted as the offset parameters of the current LCU may be output.

A process of outputting the offset mergence information and the offset parameters will now be described in detail with reference to FIG. 1B.

In operation 13, the LCU encoder 12 may encode a current LCU among a plurality of LCUs based on coding units having a tree structure.

In operation 15, the offset parameter determiner 14 may determine a first offset parameter of the current LCU. The first offset parameter may include an offset type indicating whether a pixel value classification method of the current LCU is an edge type or a band type, an offset class indicating an edge direction according to the edge type or a band range according to the band type, and offset values indicating difference values between reconstructed pixels and original pixels included in the offset class.

In operation 17, based on the sameness between the first offset parameter and a second offset parameter of a left or upper LCU of the current LCU, the offset parameter encoder 16 may further output offset mergence information of the current LCU as the first offset parameter.

If the offset parameter encoder 16 adopts the second offset parameter as the first offset parameter, only the offset mergence information may be output and the offset type, the offset class, and the offset values of the current LCU may not be output.

However, in operation 19, if the offset parameter encoder 16 does not adopt the second offset parameter as the first offset parameter, the first offset parameter may be output to include the offset type, the offset values, and the offset class of the current LCU, which are followed by the offset mergence information of the current LCU.

When the offset type, the offset values, and the offset class of the first offset parameter are output, the offset parameter encoder 16 may output the offset type, the offset values, and the offset class in the order of the offset type of the current LCU, the offset values according to categories, and the offset class.

According to another exemplary embodiment, the video encoding apparatus 10 may determine whether to perform offset adjustment on each of LCUs of a current slice.

If offset adjustment is performed on the current slice, the offset parameter determiner 14 may determine offset mergence information and offset parameters of each of the LCUs. In this case, the offset parameter encoder 16 may output offset adjustment information indicating that offset adjustment is applied to the current slice, and then may output the offset mergence information and the offset parameters of each of the LCUs.

If offset adjustment is not performed on the current slice, the offset parameter determiner 14 may not need to determine an offset of each of the LCUs of the current slice, and the offset parameter encoder 16 may output only offset adjustment information indicating that offset adjustment is not performed on the current slice.

In operation 19, the offset parameter encoder 16 may output offset values corresponding to a predetermined number of categories.

In operation 19, if the offset parameter encoder 16 outputs offset type information indicating the edge type, according to an edge direction of the reconstructed pixels included in the current LCU, an edge class indicating a direction of 0°, 90°, 45°, or 135° may be output.

In operation 19, if the offset parameter encoder 16 outputs offset type information indicating the band type, a band class indicating a band position of the reconstructed pixels included in the current LCU may be output.

In operation 19, if the offset parameter encoder 16 outputs the offset type information indicating the band type as an offset value, zero value information indicating whether the offset value is 0 or not may be output. If the offset value is 0, the offset parameter encoder 16 may output only the zero value information as the offset value.

If the offset value is not 0, the offset parameter encoder 16 may output sign information indicating whether the offset value is a positive number or a negative number, and a remainder, which are followed by the zero value information.

In operation 19, if the offset parameter encoder 16 outputs offset type information indicating the edge type, the zero value information and the remainder may be output. With respect to the edge type, the sign information of the offset value does not need to be output because a sign of the offset value is predictable based on only a category according to an edge shape. A process of predicting the sign of the offset value will be described below with reference to FIGS. 5A and 5B.

In operation 17, in order to perform offset adjustment on a luma component, a first chroma component, and a second chroma component of the current LCU, the offset parameter encoder 16 may output common offset mergence information.

In operation 19, the offset parameter encoder 16 may output a common offset type for offset parameters of the first chroma component and offset parameters of the second chroma component of the current LCU.

The video encoding apparatus 10 may include a central processor (not shown) for collectively controlling the LCU encoder 12, the offset parameter determiner 14, and the offset parameter encoder 16. Alternatively, the LCU encoder 12, the offset parameter determiner 14, and the offset parameter encoder 16 may be driven by their individual processors (not shown) that cooperatively operate to control the video encoding apparatus 10. Alternatively, an external processor (not shown) outside of the video encoding apparatus 10 may control the LCU encoder 12, the offset parameter determiner 14, and the offset parameter encoder 16.

The video encoding apparatus 10 may include one or more data storages (not shown) for storing input and output data of the LCU encoder 12, the offset parameter determiner 14, and the offset parameter encoder 16. The video encoding apparatus 10 may include a memory controller (not shown) for managing data input and output to and from the data storages.

In order to perform a video encoding operation including transformation and to output a result of the video encoding operation, the video encoding apparatus 10 may operate in association with an internal or external video encoding processor. The internal video encoding processor of the video encoding apparatus 10 may be an independent processor for performing a video encoding operation. Also, the video encoding apparatus 10, a central processing unit, or a graphic processing unit may include a video encoding processor module to perform a basic video encoding operation.

Figure 2A:
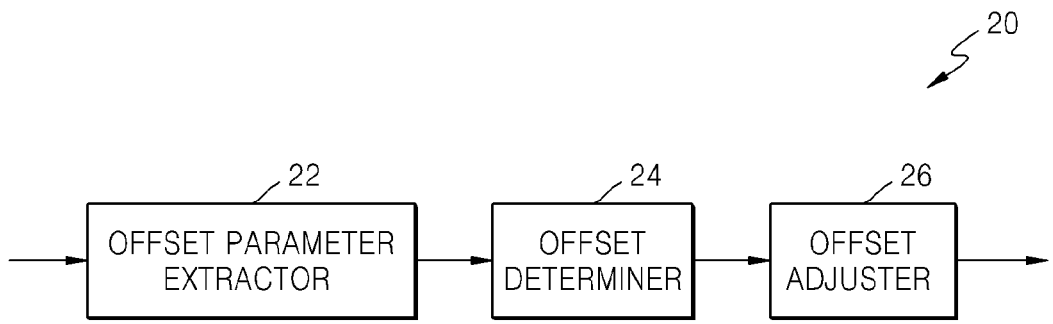
FIGS. 2A and 2B are a block diagram of a video decoding apparatus and a flowchart of an offset adjustment method of the video decoding apparatus, according to an exemplary embodiment.
Figure 2B:
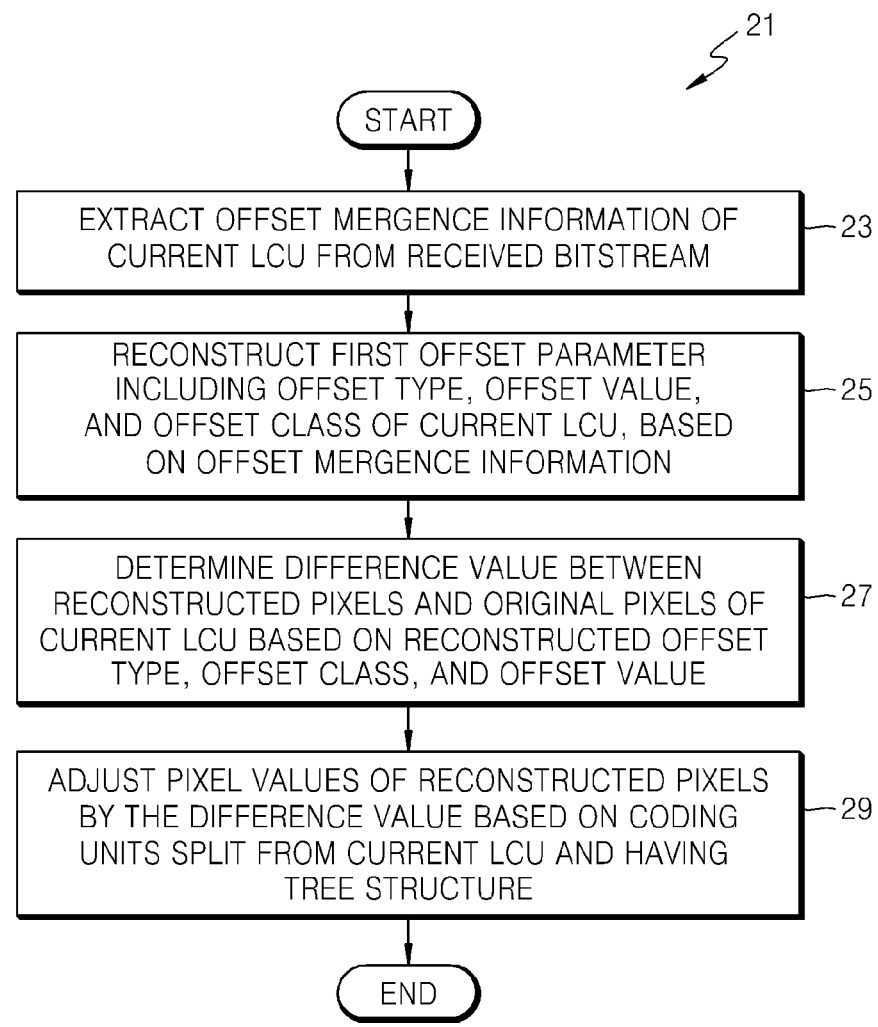

FIGS. 2A and 2B are a block diagram of a video decoding apparatus 20 and a flowchart of an offset adjustment method 21 of the video decoding apparatus 20, according to an exemplary embodiment.

The video decoding apparatus 20 includes an offset parameter extractor 22, an offset determiner 24, and an offset adjuster 26.

The video decoding apparatus 20 receives a bitstream including encoded data of a video. The video decoding apparatus 20 may parse encoded video samples from the received bitstream, may perform entropy decoding, inverse quantization, inverse transformation, prediction, and motion compensation on each image block to generate reconstructed pixels, and thus may generate a reconstructed image.

Also, the video decoding apparatus 20 may receive offset values indicating difference values between original pixels and reconstructed pixels, and may minimize an error between an original image and the reconstructed image. The video decoding apparatus 20 may receive encoded data of each LCU of the video, and may reconstruct the LCU based on coding units split from the LCU and having a tree structure. A method of reconstructing samples of and adjusting offsets of a current LCU will now be described in detail with reference to FIG. 2B.

In operation 23, the offset parameter extractor 22 may extract offset mergence information of a current LCU from a received bitstream. The offset mergence information of the current LCU indicates whether to adopt a second offset parameter of a left or upper LCU of the current LCU as a first offset parameter of the current LCU.

In operation 25, the offset parameter extractor 22 may reconstruct the first offset parameter including an offset type, offset values, and an offset class of the current LCU, based on the offset mergence information.

The offset parameter extractor 22 may determine whether to reconstruct the offset type, the offset values, and the offset class of the current LCU to be the same as those of the second offset parameter, or to extract the offset type, the offset values, and the offset class from the bitstream, based on the offset mergence information.

In operation 27, the offset determiner 24 may determine whether a pixel value classification method of the current LCU is an edge type or a band type, based on the offset type determined by the offset parameter extractor 22. Based on the offset type, an off type, the edge type, or the band type may be determined.

If the offset type is the off type, it may be determined that offset adjustment is not applied to the current LCU. In this case, other offset parameters of the current LCU do not need to be parsed.

In operation 27, the offset determiner 24 may determine a band range according to an edge direction according to the edge type or a band range according to a band type of the current LCU, based on the offset class determined by the offset parameter extractor 22.

In operation 27, the offset determiner 24 may determine difference values between reconstructed pixels and original pixels included in the above-determined offset class, based on the offset values determined by the offset parameter extractor 22.

In operation 29, the offset adjuster 26 may adjust pixel values of samples reconstructed based on coding units split from the current LCU and having a tree structure, based on the difference values determined by the offset determiner 24.

In operation 23, according to another exemplary embodiment, the offset parameter extractor 22 may extract from a header of the current slice offset adjustment information indicating whether to perform offset adjustment on each of LCUs included in the current slice. Based on the offset adjustment information, if offset adjustment is performed on the current slice, the offset parameter extractor 22 may further extract offset mergence information and offset parameters of each of the LCUs.

In operation 25, the offset parameter extractor 22 may determine to adopt the second offset parameter of the left or upper LCU as the first offset parameter, based on the offset mergence information. In this case, the offset determiner 24 may not extract the first offset parameter of the current LCU and may reconstruct the first offset parameter to be the same as the previously reconstructed second offset parameter.

In operation 25, the offset parameter extractor 22 may determine not to adopt the second offset parameter as the first offset parameter, based on the offset mergence information. In this case, the offset determiner 24 may extract and reconstruct the first offset parameter followed by the offset mergence information, from the bitstream.

In operation 23, the offset parameter extractor 22 may extract common offset mergence information of a luma component, a first chroma component, and a second chroma component of the current LCU. The offset determiner 24 may determine whether to reconstruct offset parameters of the luma component, offset parameters of the first chroma component, and offset parameters of the second chroma component to be the same as those of an adjacent LCU, based on the common offset mergence information.

Also, in operation 25, the offset determiner 24 may reconstruct a common offset type of the first chroma component and the second chroma component of the current LCU.

In operation 25, the offset determiner 24 may determine offset values corresponding to a predetermined number of categories, based on the offset parameters. Each of the offset values may be greater than or equal to a preset minimum value and may be less than or equal to a preset maximum value.

In operation 25, if offset type information indicates the edge type, the offset determiner 24 may determine an edge direction of the reconstructed pixels included in the current LCU as 0°, 90°, 45°, or 135°, based on the offset class.

In operation 27, if the offset type information indicates the band type, the offset determiner 24 may determine positions of bands to which pixel values of the reconstructed pixels belong, based on the offset class.

In operation 27, if the offset type information indicates the band type, the offset determiner 24 may determine whether an offset value is 0 or not, based on zero value information of the offset value. If the offset value is determined as 0 based on the zero value information, information of the offset value other than the zero value information is not reconstructed.

If the offset value is not determined as 0 based on the zero value information, the offset determiner 24 may determine whether the offset value is a positive number or a negative number, based on sign information of the offset value, which is followed by the zero value information. Also, by reconstructing a remainder of the offset value, which is followed by the sign information, the offset determiner 24 may determine an ultimate offset value.

Also, in operation 27, if the offset type information indicates the edge type and if the offset value is not determined as 0 based on the zero value information of the offset value, by reconstructing the remainder of the offset value, which is followed by the zero value information, the offset determiner 24 may determine an ultimate offset value.

The video decoding apparatus 20 may include a central processor (not shown) for collectively controlling the offset parameter extractor 22, the offset determiner 24, and the offset adjuster 26. Alternatively, the offset parameter extractor 22, the offset determiner 24, and the offset adjuster 26 may be driven by their individual processors (not shown) that cooperatively operate to control the video decoding apparatus 20. Alternatively, an external processor (not shown) outside the video decoding apparatus 20 may control the offset parameter extractor 22, the offset determiner 24, and the offset adjuster 26.

The video decoding apparatus 20 may include one or more data storages (not shown) for storing input and output data of the offset parameter extractor 22, the offset determiner 24, and the offset adjuster 26. The video decoding apparatus 20 may include a memory controller (not shown) for managing data input and output to and from the data storages.

In order to perform a video decoding operation to reconstruct a video, the video decoding apparatus 20 may operate in association with an internal or external video decoding processor. The internal video decoding processor of the video decoding apparatus 20 may be an independent processor for performing a basic video decoding operation. Also, the video decoding apparatus 20, a central processing unit, or a graphic processing unit may include a video decoding processor module to perform a basic video decoding operation.

The video encoding apparatus 10 and the video decoding apparatus 20 described above with reference to FIGS. 1A, 1B, 2A, and 2B use a sample adaptive offset (SAO) technique in order to minimize an error between original pixels and reconstructed pixels. According to the SAO technique, the video encoding apparatus 10 classifies pixels of each image block into preset pixel groups, allocates each pixel to a corresponding pixel group, and encodes an offset value indicating an average value of errors between the original pixels and the reconstructed pixels included in the same pixel group.

Samples are signaled between the video encoding apparatus 10 and the video decoding apparatus 20. That is, the video encoding apparatus 10 may encode and transmit samples in the form of a bitstream, and the video decoding apparatus 20 may parse and reconstruct the samples from the received bitstream. In order to minimize an error between original pixels and reconstructed pixels by adjusting pixel values of the reconstructed pixels by an offset determined according to pixel classification, the video encoding apparatus 10 and the video decoding apparatus 20 signal offset parameters. Between the video encoding apparatus 10 and the video decoding apparatus 20, signaling is performed such that offset values are encoded, transceived, and decoded as the offset parameters.

Thus, according to an SAO technique, the video decoding apparatus 20 may generate a reconstructed image having a minimized error between an original image and the reconstructed image by decoding a received bitstream, generating reconstructed pixels of each of the image blocks, reconstructing offset values from the bitstream, and adjusting the reconstructed pixels by the offset values.

Figure 3:
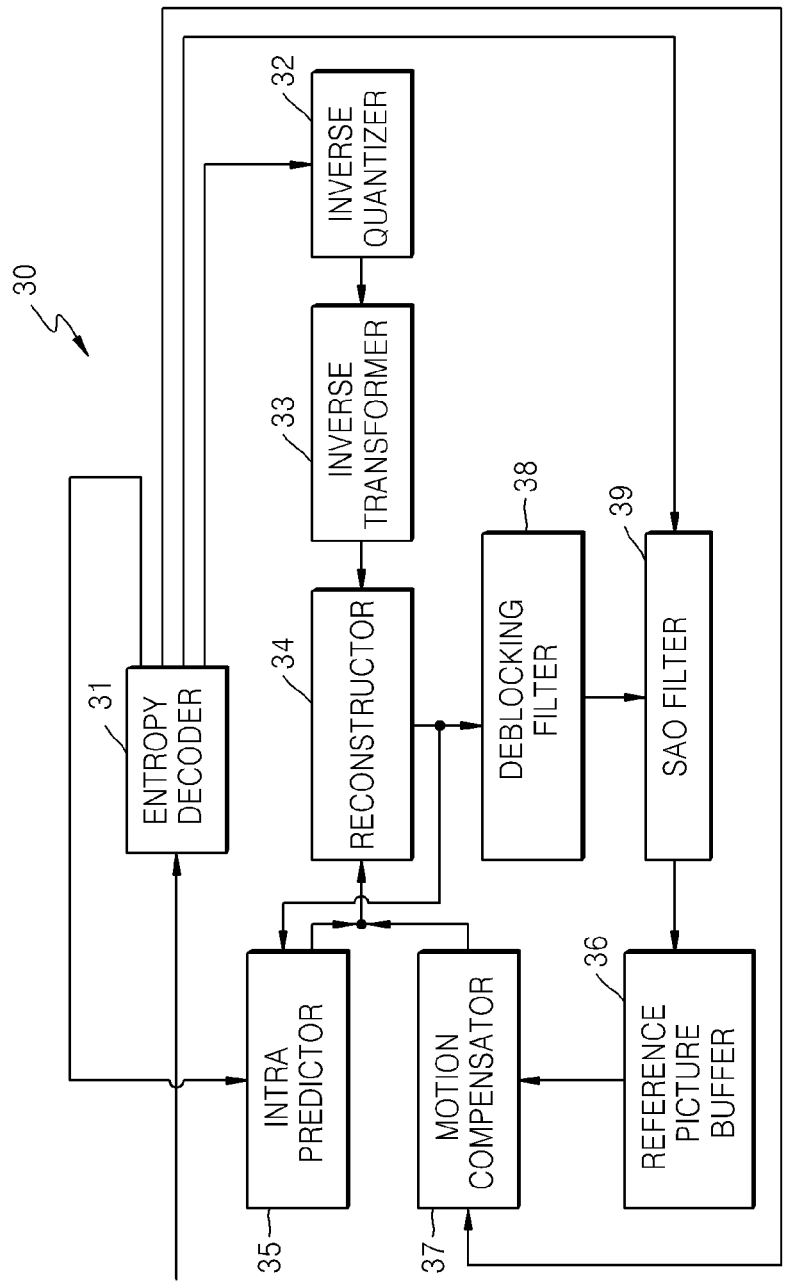
FIG. 3 is a block diagram of a video decoding apparatus according to another exemplary embodiment.

A video decoding method using an SAO technique will now be described in detail with reference to FIG. 3. FIG. 3 is a block diagram of a video decoding apparatus 30 according to another exemplary embodiment.

The video decoding apparatus 30 includes an entropy decoder 31, an inverse quantizer 32, an inverse transformer 33, a reconstructor 34, an intra predictor 35, a reference picture buffer 36, a motion compensator 37, a deblocking filter 38, and an SAO filter 39.

The video decoding apparatus 30 may receive a bitstream including encoded video data. The entropy decoder 31 may parse intra mode information, inter mode information, SAO information, and residues from the bitstream.

The residues extracted by the entropy decoder 31 may be quantized transformation coefficients. Accordingly, the inverse quantizer 32 may perform inverse quantization on the residues to reconstruct transformation coefficients, and the inverse transformer 33 may perform inverse transformation on the reconstructed coefficients to reconstruct residual values of the space domain.

In order to predict and reconstruct the residual values of the space domain, intra prediction or motion compensation may be performed.

If the intra mode information is extracted by the entropy decoder 31, the intra predictor 35 may determine reference samples to be referred to reconstruct current samples from among samples spatially adjacent to the current samples, by using the intra mode information. The reference samples may be selected from among samples previously reconstructed by the reconstructor 34. The reconstructor 34 may reconstruct the current samples by using the reference samples determined based on the intra mode information and the residual values reconstructed by the inverse transformer 33.

If the inter mode information is extracted by the entropy decoder 31, the motion compensator 37 may determine a reference picture to be referred to reconstruct current samples of a current picture from among pictures reconstructed previously to the current picture, by using the inter mode information. The inter mode information may include motion vectors, reference indices, etc. By using the reference indices, from among pictures reconstructed previously to the current picture and stored in the reference picture buffer 36, a reference picture to be used to perform motion compensation on the current samples may be determined. By using the motion vectors, a reference block of the reference picture to be used to perform motion compensation on a current block may be determined. The reconstructor 34 may reconstruct the current samples by using the reference block determined based on the inter mode information and the residual values reconstructed by the inverse transformer 33.

The reconstructor 34 may reconstruct samples and may output reconstructed pixels. The reconstructor 34 may generate reconstructed pixels of each of the LCUs based on coding units having a tree structure.

The deblocking filter 38 may perform filtering for reducing a blocking phenomenon of pixels disposed at edge regions of the LCU or each of the coding units having a tree structure.

Also, the SAO filter 39 may adjust offsets of reconstructed pixels of each LCU according to an SAO technique. The SAO filter 39 may determine an offset type, an offset class, and offset values of a current LCU based on the SAO information extracted by the entropy decoder 31.

An operation of extracting the SAO information by the entropy decoder 31 may correspond to an operation of the offset parameter extractor 22 of the video decoding apparatus 20, and operations of the SAO filter 39 may correspond to operations of the offset determiner 24 and the offset adjuster 26 of the video decoding apparatus 20.

The SAO filter 39 may determine signs and difference values of the offset values with respect to the reconstructed pixels of the current LCU based on the offset values determined from the SAO information. The SAO filter 39 may reduce errors between the reconstructed pixels and original pixels by increasing or reducing pixel values of the reconstructed pixels by the difference values determined based on the offset values.

A picture including the reconstructed pixels offset-adjusted by the SAO filter 39 may be stored in the reference picture buffer 36. Thus, by using a reference picture having minimized errors between reconstructed samples and original pixels according to an SAO technique, motion compensation may be performed on a next picture.

According to the SAO technique, based on difference values between reconstructed pixels and original pixels, an offset of a pixel group including the reconstructed pixels may be determined. For the SAO technique, exemplary embodiments for classifying reconstructed pixels into pixel groups will now be described in detail.

According to an SAO technique, pixels may be classified (i) based on an edge type of reconstructed pixels, or (ii) a band type of reconstructed pixels. Whether pixels are classified based on an edge type or a band type may be defined by using an offset type.

An exemplary embodiment of classifying pixels based on an edge type according to an SAO technique will now be described in detail.

When edge-type offsets of a current LCU are determined, an edge class of each of the reconstructed pixels included in the current LCU may be determined. That is, by comparing pixel values of current reconstructed pixels and adjacent pixels, an edge class of the current reconstructed pixels may be defined. An example of determining an edge class will now be described with reference to FIG. 4.

Figures 4, 5A:
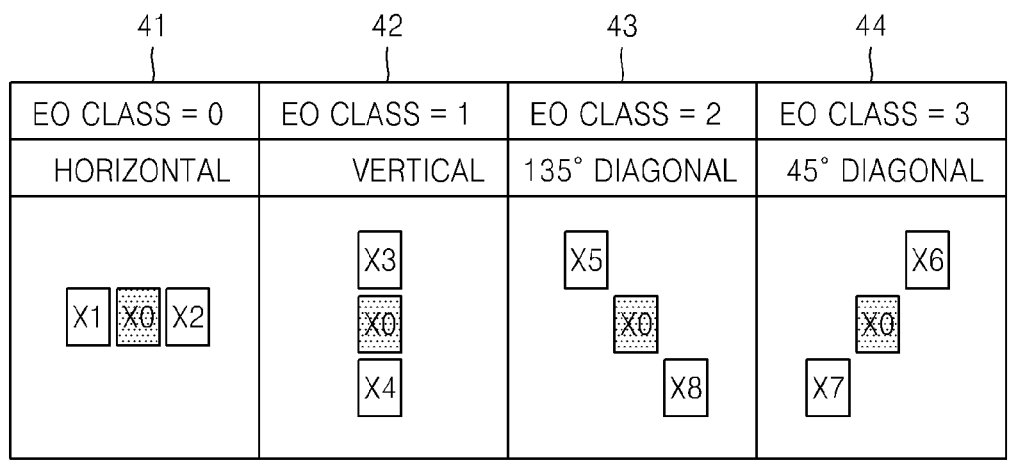
FIG. 4 is a table showing edge classes of edge types, according to an exemplary embodiment.
FIGS. 5A and 5B show a table and a graph showing categories of edge types, according to an exemplary embodiment.

FIG. 4 is a table showing edge classes of edge types, according to an exemplary embodiment.

Indices 0, 1, 2, and 3 may be sequentially allocated to edge classes 41, 42, 43, and 44. If an edge type frequently occurs, a small index may be allocated to the edge type.

An edge class may indicate a direction of 1-dimensional edges formed between a current reconstructed pixel X0 and two adjacent pixels. The edge class 41 having the index 0 indicates a case when edges are formed between the current reconstructed pixel X0 and two horizontally adjacent pixels X1 and X2. The edge class 42 having the index 1 indicates a case when edges are formed between the current reconstructed pixel X0 and two vertically adjacent pixels X3 and X4. The edge class 43 having the index 2 indicates a case when edges are formed between the current reconstructed pixel X0 and two 135°-diagonally adjacent pixels X5 and X8. The edge class 44 having the index 3 indicates a case when edges are formed between the current reconstructed pixel X0 and two 45°-diagonally adjacent pixels X6 and X7.

Accordingly, by analyzing edge directions of reconstructed pixels included in a current LCU and thus determining a strong edge direction in the current LCU, an edge class of the current LCU may be determined.

With respect to each edge class, categories may be classified according to an edge shape of a current pixel. An example of categories according to edge shapes will now be described with reference to FIGS. 5A and 5B.

Figure 5B:
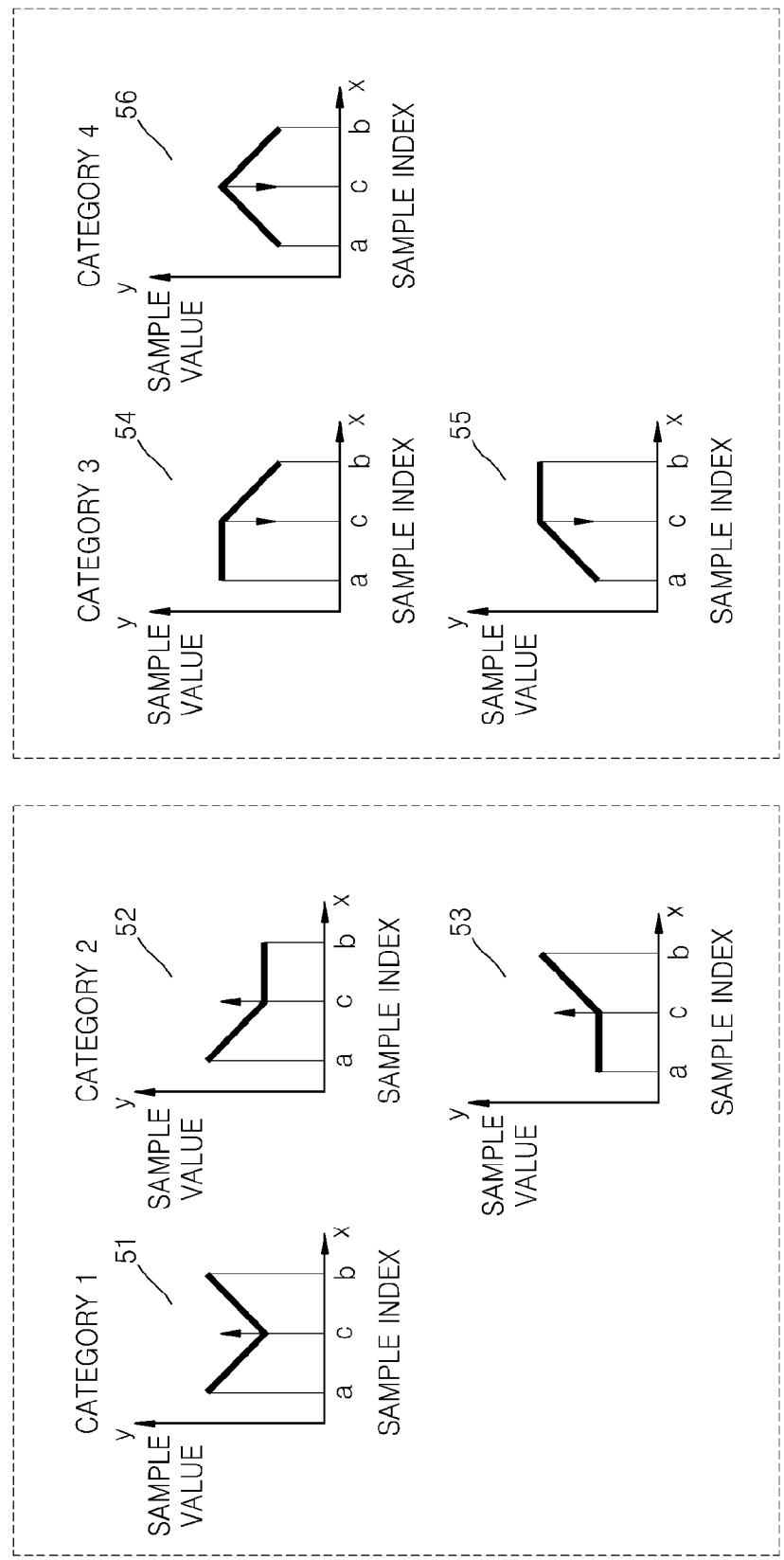

FIGS. 5A and 5B are a table and a graph showing categories of edge types, according to an exemplary embodiment.

An edge category indicates whether a current pixel corresponds to a lowest point of a concave edge, a pixel disposed at a curved corner around a lowest point of a concave edge, a highest point of a convex edge, or a pixel disposed at a curved corner around a highest point of a convex edge.

FIG. 5A exemplarily shows conditions for determining categories of edges. FIG. 5B exemplarily shows edge shapes between a reconstructed pixel and adjacent pixels and their pixel values c, a, and b.

C indicates an index of a current reconstructed pixel, and a and b indicate indices of adjacent pixels at two sides of the current reconstructed pixel according to an edge direction. Xa, Xb, and Xc respectively indicate pixel values of reconstructed pixels having the indices a, b, and c. In FIG. 5B, an x axis indicate indices of the current reconstructed pixel and the adjacent pixels at two sides of the current reconstructed pixel, and a y axis indicate pixel values of samples.

Category 1 indicates a case when a current sample corresponds to a lowest point of a concave edge, e.g., a local valley. As shown in graph 51 (Xc<Xa && Xc<Xb), if the current reconstructed pixel c between the adjacent pixels a and b corresponds to a lowest point of a concave edge, the current reconstructed pixel may be classified as category 1.

Category 2 indicates a case when a current sample is disposed at a curved corner around a lowest point of a concave edge, e.g., a concave corner. As shown in graph 52 (Xc<Xa && Xc==Xb), if the current reconstructed pixel c between the adjacent pixels a and b is disposed at an end point of a downward curve of a concave edge or, as shown in graph 53 (Xc==Xa && Xc<Xb), if the current reconstructed pixel c is disposed at a start point of an upward curve of a concave edge, the current reconstructed pixel may be classified as category 2.

Category 3 indicates a case when a current sample is disposed at a curved corner around a highest point of a convex edge, e.g., a convex corner. As shown in graph 54 (Xc>Xb && Xc==Xa), if the current reconstructed pixel c between the adjacent pixels a and b is disposed at a start point of a downward curve of a convex edge or, as shown in graph 55 (Xc==Xb && Xc>Xa), if the current reconstructed pixel c is disposed at an end point of an upward curve of a convex edge, the current reconstructed pixel may be classified as category 3.

Category 4 indicates a case when a current sample corresponds to a highest point of a convex edge, e.g., a local peak. As shown in graph 56 (Xc>Xa && Xc>Xb), if the current reconstructed pixel c between the adjacent pixels a and b corresponds to a highest point of a convex edge, the current reconstructed pixel may be classified as category 4.

If the current reconstructed pixel does not satisfy any of the conditions of the categories 1, 2, 3, and 4, the current reconstructed pixel does not correspond to an edge and thus is classified as category 0, and an offset of category 0 does not need to be encoded.

According to an exemplary embodiment, with respect to reconstructed pixels corresponding to the same category, an average value of difference values between the reconstructed pixels and original pixels may be determined as an offset of a current category. Also, offsets of all categories may be determined.

The concave edges of the categories 1 and 2 may be smoothed if reconstructed pixel values are adjusted by using positive offset values, and may be sharpened due to negative offset values. The convex edges of the categories 3 and 4 may be smoothed due to negative offset values and may be sharpened due to positive offset values.

The video encoding apparatus 10 may not allow the sharpening effect of edges. Here, the concave edges of the categories 1 and 2 need positive offset values, and the convex edges of the categories 3 and 4 need negative offset values. In this case, if a category of an edge is known, a sign of an offset value may be determined. Accordingly, the video encoding apparatus 10 may not transmit the sign of the offset value and may transmit only an absolute value of the offset value. Also, the video decoding apparatus 20 may not receive the sign of the offset value and may receive only an absolute value of the offset value.

Accordingly, the video encoding apparatus 10 may encode and transmit offset values according to categories of a current edge class, and the video decoding apparatus 20 may adjust reconstructed pixels of the categories by the received offset values.

For example, if an offset value of an edge type is determined as 0, the video encoding apparatus 10 may transmit only zero value information as the offset value.

For example, if an offset value of an edge type is not 0, the video encoding apparatus 10 may transmit zero value information and an absolute value as the offset value. A sign of the offset value does not need to be transmitted.

The video decoding apparatus 20 reads the zero value information from the received offset value, and may read the absolute value of the offset value if the offset value is not 0. The sign of the offset value may be predicted according to an edge category based on an edge shape between a reconstructed pixel and adjacent pixels.

Accordingly, the video encoding apparatus 10 may classify pixels according to edge directions and edge shapes, may determine an average error value between pixels having the same characteristics as an offset value, and may determine offset values according to categories. The video encoding apparatus 10 may encode and transmit offset type information indicating an edge type, offset class information indicating an edge direction, and the offset values.

The video decoding apparatus 20 may receive the offset type information, the offset class information, and the offset values, and may determine an edge direction according to the offset type information and the offset class information. The video decoding apparatus 20 may determine an offset value of reconstructed pixels of a category corresponding to an edge shape according to the edge direction, and may adjust pixel values of the reconstructed pixels by the offset value, thereby minimizing an error between an original image and a reconstructed image.

An exemplary embodiment of classifying pixels based on a band type according to an SAO technique will now be described in detail.

According to an exemplary embodiment, each of the pixel values of reconstructed pixels may belong to one of a plurality of bands. For example, the pixel values may have a total range from a minimum value Min of 0 to a maximum value Max of $2^{\wedge}(p-1)$ according to p-bit sampling. If the total range (Min, Max) of the pixel values is divided into K periods, each period of the pixel values is referred to as a band. If $B_k$ indicates a maximum value of a kth band, bands $[B_0, B_1-1]$, $[B_1, B_2-1]$, $[B_2, B_3-1]$, ..., and $[B_k-1, B_k]$ may be divided. If a pixel value of a current reconstructed pixel Rec(x,y) belongs to the band $[B_k-1, B_k]$, a current band may be determined as k. The bands may be equally or unequally divided.

For example, if pixel values are classified into equal 8-bit pixel bands, the pixel values may be divided into 32 bands. In more detail, they may be classified into bands [0, 7], [8, 15], ..., [240, 247], and [248, 255].

From among a plurality of bands classified according to a band type, a band to which each of pixel values of reconstructed pixels belongs may be determined. Also, an offset value indicating an average of errors between original pixels and reconstructed pixels in each band may be determined.

Accordingly, the video encoding apparatus 10 and the video decoding apparatus 20 may encode and transceive an offset corresponding to each of the bands classified according to a current band type, and may adjust reconstructed pixels by the offset.

Accordingly, with respect to a band type, the video encoding apparatus 10 and the video decoding apparatus 20 may classify reconstructed pixels according to bands to which their pixel values belong, may determine an offset as an average of error values of reconstructed pixels that belong to the same band, and may adjust the reconstructed pixels by the offset, thereby minimizing an error between an original image and a reconstructed image.

When an offset according to a band type is determined, the video encoding apparatus 10 and the video decoding apparatus 20 may classify reconstructed pixels into categories according to a band position. For example, if the total range of the pixel values is divided into K bands, categories may be indexed according to a band index k indicating a kth band. The number of categories may be determined to correspond to the number of bands.

However, in order to reduce data, the video encoding apparatus 10 and the video decoding apparatus 20 may restrict the number of categories used to determine offsets according to an SAO technique. For example, a predetermined number of bands that are continuous from a band having a predetermined start position in a direction in which a band index is increased may be allocated as categories, and only an offset of each category may be determined.

For example, if a band having an index of 12 is determined as a start band, four bands from the start band, e.g., bands having indices of 12, 13, 14, and 15 may be allocated as categories 1, 2, 3, and 4. Accordingly, an average error between reconstructed pixels and original pixels included in a band having the index of 12 may be determined as an offset of category 1. Likewise, an average error between reconstructed pixels and original pixels included in a band having the index of 13 may be determined as an offset of category 2, an average error between reconstructed pixels and original pixels included in a band having the index of 14 may be determined as an offset of category 3, and an average error between reconstructed pixels and original pixels included in a band having the index of 15 may be determined as an offset of category 4.

In this case, information about a start band position is required to determine positions of bands allocated as categories. Accordingly, the video encoding apparatus 10 may encode and transmit the information about the start band position as the offset class. The video encoding apparatus 10 may encode and transmit an offset type indicating a band type, an offset class, and offset values according to categories.

The video decoding apparatus 20 may receive the offset type, the offset class, and the offset values according to the categories. If the received offset type is a band type, the video decoding apparatus 20 may read a start band position from the offset class. The video decoding apparatus 20 may determine a band to which reconstructed pixels belong, from among four bands from the start band, may determine an offset value allocated to a current band from among the offset values according to the categories, and may adjust pixel values of the reconstructed pixels by the offset value.

Hereinabove, an edge type and a band type are introduced as offset types, and an offset class and a category according to the offset type are described in detail. Offset parameters encoded and transceived by the video encoding apparatus 10 and the video decoding apparatus 20 will now be described in detail.

The video encoding apparatus 10 and the video decoding apparatus 20 may determine an offset type according to a pixel classification method of reconstructed pixels of each LCU.

The offset type may be determined according to image characteristics of each block. For example, with respect to an LCU including a vertical edge, a horizontal edge, and a diagonal edge, in order to change edge values, offset values may be determined by classifying pixel values according to an edge type. With respect to an LCU not including an edge region, offset values may be determined according to band classification. Accordingly, the video encoding apparatus 10 and the video decoding apparatus 20 may signal the offset type with respect to each of the LCUs.

The video encoding apparatus 10 and the video decoding apparatus 20 may determine offset parameters with respect to each LCU. That is, offset types of reconstructed pixels of an LCU may be determined, the reconstructed pixels of the LCU may be classified into categories, and offset values may be determined according to the categories.

From among the reconstructed pixels included in the LCU, the video encoding apparatus 10 may determine an average error of reconstructed pixels classified into the same category, as an offset value. An offset value of each category may be determined.

According to an exemplary embodiment, the offset parameters may include an offset type, offset values, and an offset class. The video encoding apparatus 10 and the video decoding apparatus 20 may transceive the offset parameters determined with respect to each LCU.

From among offset parameters of an LCU, the video encoding apparatus 10 may encode and transmit the offset type and the offset values. If the offset type is an edge type, the video encoding apparatus 10 may further transmit an offset class indicating an edge direction, which is followed by the offset type and the offset values according to categories. If the offset type is a band type, the video encoding apparatus 10 may further transmit an offset class indicating a start band position, which is followed by the offset type and the offset values according to categories.

The video decoding apparatus 20 may receive the offset parameters of each LCU, which includes the offset type, the offset values, and the offset class. Also, the video decoding apparatus 20 may select an offset value of a category to which each reconstructed pixel belongs, from among the offset values according to categories, and may adjust the reconstructed pixel by the selected offset value.

An exemplary embodiment of transceiving offset values from among offset parameters will now be described.

In order to transmit the offset values, the video encoding apparatus 10 may further transmit zero value information. According to the zero value information, sign information and a remainder may be further transmitted.

The zero value information may be a 1-bit flag. That is, a '0' flag indicating that the offset value is 0 or a '1' flag indicating that the offset value is not 0 may be transmitted.

If the zero value information is the '0' flag, the sign information or the remainder does not need to be encoded. However, if the zero value information is the '1' flag, the sign information and the remainder may be further transmitted.

However, as described above, with respect to the edge type, since the offset value may be predicted as a positive number or a negative number according to a category, the sign information does not need to be transmitted. Accordingly, if the zero value information is the '1' flag, the remainder may be further transmitted.

According to an exemplary embodiment, an offset value Off-set may be previously restricted within a range from a minimum value MinOffSet and a maximum value MaxOff-Set before the offset value is determined (MinOffSet≤Off-Set≤MaxOffSet).

For example, with respect to an edge type, offset values of reconstructed pixels of categories 1 and 2 may be determined within a range from a minimum value of 0 to a maximum value of 7. With respect to the edge type, offset values of reconstructed pixels of categories 3 and 4 may be determined within a range from a minimum value of −7 to a maximum value of 0.

For example, with respect to a band type, offset values of reconstructed pixels of all categories may be determined within a range from a minimum value of −7 to a maximum value of 7.

In order to reduce transmission bits of an offset value, a remainder may be restricted to a p-bit value instead of a negative number. In this case, the remainder may be greater than or equal to 0 and may be less than or equal to a difference value between the maximum value and the minimum value (0≤Remainder≤MaxOffSet−MinOffSet+1≤2^p). If the video encoding apparatus 10 transmits the remainder and the video decoding apparatus 20 knows at least one of the maximum value and the minimum value of the offset value, an original offset value may be reconstructed by using only the received remainder.

From among offset parameter components, offset mergence information will now be described in detail.

Offset types and/or offset values of adjacent blocks may be the same, although are not limited to being the same. The video encoding apparatus 10 may compare offset parameters of a current block to offset parameters of adjacent blocks and may merge and encode the offset parameters of the current block and the adjacent blocks if the offset parameters are the same. If the offset parameters of the adjacent block are previously encoded, the offset parameters of the adjacent block may be adopted as the offset parameters of the current block. Accordingly, the video encoding apparatus 10 may not encode the offset parameters of the current block and may encode only the offset mergence information of the current block.

Before the offset parameters are parsed from a received bitstream, the video decoding apparatus 20 may initially parse the offset mergence information and may determine whether to parse the offset parameters. The video decoding apparatus 20 may determine whether an adjacent block having the same offset parameters as those of the current block exists based on the offset mergence information.

For example, if an adjacent block having the same offset parameters as those of the current block exists based on the offset mergence information, the video decoding apparatus 20 may not parse the offset parameters of the current block and may adopt reconstructed offset parameters of the adjacent block as the offset parameters of the current block. Accordingly, the video decoding apparatus 20 may reconstruct the offset parameters of the current block to be the same as those of the adjacent block. Also, based on the offset mergence information, an adjacent block having offset parameters to be referred to may be determined.

For example, if the offset parameters of the adjacent blocks are different from the offset parameters of the current block based on the offset mergence information, the video decoding apparatus 20 may parse and reconstruct the offset parameters of the current block from the bitstream.

Figure 6:
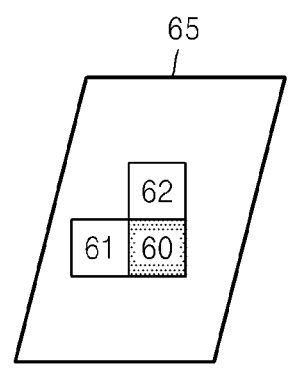
FIG. 6 is a diagram showing adjacent largest coding units (LCUs) referred to merge offset parameters, according to an exemplary embodiment.

FIG. 6 is a diagram showing adjacent LCUs referred to merge offset parameters, according to an exemplary embodiment.

The video encoding apparatus 10 may determine a candidate list of adjacent LCUs to be referred to predict offset parameters of a current LCU 60 from among adjacent LCUs reconstructed prior to the current LCU 60. The video encoding apparatus 10 may compare offset parameters of the current LCU 60 and the adjacent LCUs in the candidate list.

For example, left and upper LCUs 61 and 62 of the current block 60 in a current picture 65 may be included in the candidate list.

Accordingly, the video encoding apparatus 10 may compare offset parameters of the adjacent LCUs included in the candidate list to those of the current LCU 60 according to a reference order. For example, the offset parameters may be compared to those of the current LCU 60 in the order of the left LCU 61 and the upper LCU 62. From among the compared left and upper LCUs 61 and 62, an LCU having the same offset parameters as those of the current LCU 60 may be determined as a reference LCU.

In order to predict the offset parameters of the current LCU 60, the video encoding apparatus 10 and the video decoding apparatus 20 may refer to the same adjacent LCUs. Also, offset mergence information indicating an LCU having offset parameters to be referred to may be transceived. The video decoding apparatus 20 may select one of the adjacent LCUs based on the offset mergence information, and may reconstruct the offset parameters of the current LCU 60 to be the same as those of the selected adjacent LCU.

For example, it is assumed that the left and upper LCUs 61 and 62 are referred to. The offset parameter encoder 16 may encode left offset mergence information indicating whether the offset parameters of the left LCU 61 of the current LCU 60 are the same as those of the current LCU 60, and upper offset mergence information indicating whether the offset parameters of the upper LCU 62 are the same as those of the current LCU 60, as the offset mergence information. In this case, the offset parameters of the current LCU 60 and the left LCU 61 may be initially compared to determine whether they are the same, and then the offset parameters of the current LCU 60 and the upper LCU 62 may be compared to determine whether they are the same. According to a comparison result, the offset mergence information may be determined.

If the offset parameters of at least one of the left and upper LCUs 61 and 62 are the same as those of the current LCU 60, the offset parameter encoder 16 may encode only the left or upper offset mergence information and may not encode the offset parameters of the current LCU 60.

If the offset parameters of both of the left and upper LCUs 61 and 62 are different from those of the current LCU 60, the offset parameter encoder 16 may encode the left or upper offset mergence information and the offset parameters of the current LCU 60.

Offset parameters according to color components will now be described in detail.

The video encoding apparatus 10 and the video decoding apparatus 20 may mutually predict offset parameters between color components.

An SAO technique may be applied to luma blocks and chroma blocks in a YCrCb color format. Offset values of a luma component and chroma components of a current LCU may be determined, respectively.

According to an exemplary embodiment, common offset mergence information may be applied to a Y component, a Cr component, and a Cb component of the current LCU. That is, based on one piece of offset mergence information, it may be determined whether offset parameters of the Y component are the same as those of the Y component of an adjacent LCU, it may be determined whether offset parameters of the Cr component are the same as those of the Cr component of the adjacent LCU, and it may be determined whether offset parameters of the Cb component are the same as those of the Cb component of the adjacent LCU.

According to another exemplary embodiment, common offset type information may be applied to the Cr component and the Cb component of the current LCU. That is, based on one piece of offset type information, it may be determined whether offset values of the Cr component and the Cb component are determined according to an edge type or a band type.

An offset parameter parsing process of each color component of a current LCU will now be described in detail with reference to FIG. 7.

Figure 7:
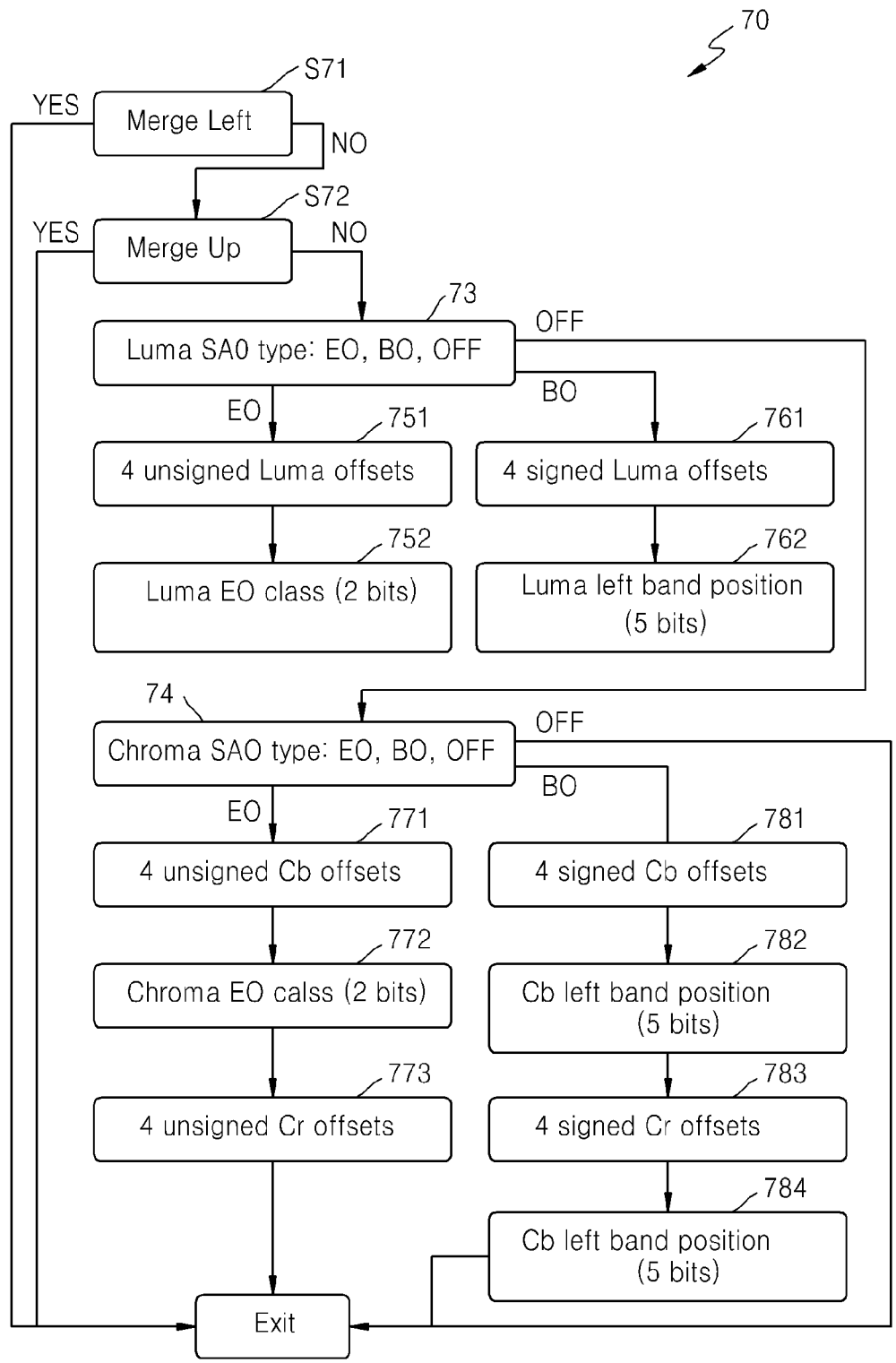
FIG. 7 is a flowchart of a process of parsing offset parameters, according to an exemplary embodiment.

FIG. 7 is a flowchart of a process 70 of parsing offset parameters, according to an exemplary embodiment.

Initially, in operation 71, left offset mergence information of a current LCU is parsed (Merge Left). Based on the left offset mergence information, if it is determined to refer to offset parameters of a left LCU, the process 70 on the current LCU is terminated and the offset parameters of the current LCU may be determined to be the same as those of the left LCU.

If it is determined not to refer to the offset parameters of the left LCU based on the left offset mergence information in operation 71, in operation 72, upper offset mergence information of the current LCU is parsed (Merge Up). If it is determined to refer to offset parameters of an upper LCU, the process 70 on the current LCU is terminated and the offset parameters of the current LCU may be determined to be the same as those of the upper LCU.

If it is determined not to refer to the offset parameters of the upper LCU based on the upper offset mergence information in operation 72, in operation 73, the offset parameters of the current LCU are parsed.

Initially, in operation 73, an offset type (SAO type) of a luma component is parsed. If the offset type is an off type (OFF), since offset adjustment according to an SAO technique is not performed on the luma component, in order to parse offset parameters of a chroma component, the process 70 on the current LCU proceeds to operation 74.

If the offset type of the luma component is an edge type (EO) in operation 73, in operation 751, luma offset values of four categories may be parsed. The offset values of the edge type may be parsed without sign information. In operation 752, a luma edge class (Luma EO class) of 2 bits may be parsed. An edge direction of the luma component of the current LCU may be determined based on the luma edge class.

As described above, since offset values of four categories indicating edge shapes are received, a total of four offset values are received. Since each reconstructed luma pixel of the current LCU may be compared to adjacent pixels according to an edge direction and thus its edge shape and its category may be determined, an offset value of a current category may be selected from among the received offset values. A pixel value of the reconstructed luma pixel may be adjusted by using the selected offset value.

If the offset type of the luma component is a band type (BO) in operation 73, in operation 761, luma offset values of four categories may be parsed. The offset values of the band type may be parsed together with sign information. In operation 762, a luma band class of 5 bits may be parsed. A luma start band position (Luma left band position) may be determined from among a plurality of bands of pixel values of reconstructed pixels of the current LCU based on the luma band class.

As described above, since offset values of four categories indicating four continuous bands from a start band position are received, a total of four offset values are received. Since a band to which each reconstructed luma pixel of the current LCU belongs may be determined and thus a category of each reconstructed luma pixel of the current LCU may be determined, an offset value of a current category may be selected from among the received offset values. A pixel value of the reconstructed luma pixel may be adjusted by using the selected offset value.

Then, in operation 74, an offset type of a chroma component is parsed. The offset type may be commonly applied to a Cr component and a Cb component. If the offset type is an off type (OFF), since offset adjustment according to an SAO technique is not performed on the chroma component, the process on the current LCU is terminated.

If the offset type of the chroma component is an edge type (EO) in operation 74, in operation 771, Cb offset values of four categories may be parsed. The Cb offset values of the edge type may be parsed without sign information. In operation 772, a chroma edge class (Chroma EO class) of 2 bits may be parsed. An edge direction of the chroma component of the current LCU may be determined based on the chroma edge class. The chroma edge class may also be commonly applied to the Cr component and the Cb component. Cr offset values of four categories may be parsed in operation 773.

Similar to offset adjustment on the edge type of the luma component, on each of the Cr component and the Cb component, an offset value of a current category may be selected from among received offset values. A pixel value of a reconstructed pixel of the Cr component or the Cb component may be adjusted by using the selected offset value.

If the offset type of the chroma component is a band type (BO) in operation 74, in operation 781, offset values of the Cb component of four categories may be parsed together with sign information. In operation 782, a Cb band class of 5 bits may be parsed. A Cb start band position (Cb left band position) of reconstructed pixels of the Cb component of the current LCU may be determined based on the Cb band class. In operation 783, offset values of the Cr component of four categories may be parsed together with sign information. In operation 784, a Cr band class of 5 bits may be parsed. A Cr start band position (Cr left band position) of reconstructed pixels of the Cr component of the current LCU may be determined based on the Cr band class.

Similar to offset adjustment on the band type of the luma component, on each of the Cr component and the Cb component, an offset value of a current category may be selected from among received offset values. A pixel value of a reconstructed pixel of the Cr component or the Cb component may be adjusted by using the selected offset value.

Accordingly, the video encoding apparatus 10 and the video decoding apparatus 20 or 30 using an SAO technique may classify pixel values of each LCU according to image characteristics such as an edge type or a band type, may signal an offset value that is an average error value of pixel values having the same characteristics, and may adjust unpredictable pixel values of reconstructed pixels by the offset value, thereby minimizing an error between an original image and a reconstructed image.

In the video encoding apparatus 10 and the video decoding apparatus 20, as described above, video data may be split into LCUs, each LCU may be encoded and decoded based on coding units having a tree structure, and each LCU may determine offset values according to pixel classification. Hereinafter, a video encoding method, a video encoding apparatus, a video decoding method, and a video decoding apparatus based on coding units having a tree structure and transformation units will be described with reference to FIGS. 1A through 20.

Figure 8:
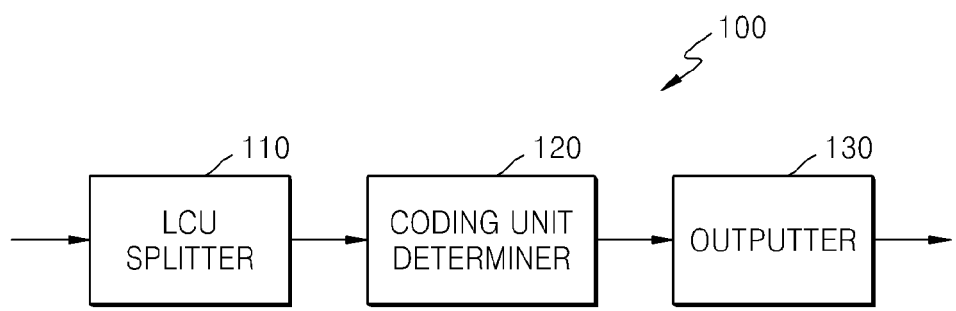
FIG. 8 is a block diagram of a video encoding apparatus based on coding units according to a tree structure, according to an exemplary embodiment.

FIG. 8 is a block diagram of a video encoding apparatus 100 based on coding units according to a tree structure, according to an exemplary embodiment.

The video encoding apparatus 100 involving video prediction based on coding units according to a tree structure includes an LCU splitter 110, a coding unit determiner 120, and an outputter 130.

The LCU splitter 110 may split a current picture based on an LCU that is a coding unit having a maximum size for a current picture of an image. If the current picture is larger than the LCU, image data of the current picture may be split into the at least one LCU. The LCU according to an exemplary embodiment may be a data unit having a size of 32×32, 64×64, 128×128, 256×256, etc., wherein a shape of the data unit is a square having a width and length in squares of 2. The image data may be output to the coding unit determiner 120 according to the at least one LCU.

A coding unit according to an exemplary embodiment may be characterized by a maximum size and a depth. The depth denotes the number of times the coding unit is spatially split from the LCU, and as the depth deepens, deeper coding units according to depths may be split from the LCU to a smallest coding unit (SCU). A depth of the LCU is an uppermost depth and a depth of the SCU is a lowermost depth. Since a size of a coding unit corresponding to each depth decreases as the depth of the LCU deepens, a coding unit corresponding to an upper depth may include a plurality of coding units corresponding to lower depths.

As described above, the image data of the current picture is split into the LCUs according to a maximum size of the coding unit, and each of the LCUs may include deeper coding units that are split according to depths. Since the LCU according to an exemplary embodiment is split according to depths, the image data of the space domain included in the LCU may be hierarchically classified according to depths.

A maximum depth and a maximum size of a coding unit, which limit the total number of times a height and a width of the LCU are hierarchically split, may be predetermined.

The coding unit determiner 120 encodes at least one split region obtained by splitting a region of the LCU according to depths, and determines a depth to output finally encoded image data according to the at least one split region. In other words, the coding unit determiner 120 determines a coded depth by encoding the image data in the deeper coding units according to depths, according to the LCU of the current picture, and selecting a depth having the least encoding error. The determined coded depth and the encoded image data according to the determined coded depth are output to the outputter 130.

The image data in the LCU is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each LCU.

The size of the LCU is split as a coding unit is hierarchically split according to depths, and as the number of coding units increases. Also, even if coding units correspond to the same depth in one LCU, it is determined whether to split each of the coding units corresponding to the same depth to a lower depth by measuring an encoding error of the image data of each coding unit, separately. Accordingly, even when image data is included in one LCU, the encoding errors may differ according to regions in the one LCU, and thus the coded depths may differ according to regions in the image data. Thus, one or more coded depths may be determined in one LCU, and the image data of the LCU may be divided according to coding units of at least one coded depth.

Accordingly, the coding unit determiner 120 may determine coding units having a tree structure included in the LCU. The 'coding units having a tree structure' according to an exemplary embodiment include coding units corresponding to a depth determined to be the coded depth, from among all deeper coding units included in the LCU. A coding unit of a coded depth may be hierarchically determined according to depths in the same region of the LCU, and may be independently determined in different regions. Similarly, a coded depth in a current region may be independently determined from a coded depth in another region.

A maximum depth according to an exemplary embodiment is an index related to the number of splitting times from an LCU to an SCU. A first maximum depth according to an exemplary embodiment may denote the total number of splitting times from the LCU to the SCU. A second maximum depth according to an exemplary embodiment may denote the total number of depth levels from the LCU to the SCU. For example, when a depth of the LCU is 0, a depth of a coding unit, in which the LCU is split once, may be set to 1, and a depth of a coding unit, in which the LCU is split twice, may be set to 2. Here, if the SCU is a coding unit in which the LCU is split four times, 5 depth levels of depths 0, 1, 2, 3, and 4 exist, and thus the first maximum depth may be set to 4, and the second maximum depth may be set to 5.

Prediction encoding and transformation may be performed according to the LCU. The prediction encoding and the transformation are also performed based on the deeper coding units according to a depth equal to or depths less than the maximum depth, according to the LCU.

Since the number of deeper coding units increases whenever the LCU is split according to depths, encoding, including the prediction encoding and the transformation, is performed on all of the deeper coding units generated as the depth deepens. For convenience of description, the prediction encoding and the transformation will now be described based on a coding unit of a current depth, in an LCU.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the LCU, the prediction encoding may be performed based on a coding unit corresponding to a coded depth, e.g., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit. In order to perform the transformation in the coding unit, the transformation may be performed based on a data unit having a size smaller than or equal to the coding unit. For example, the data unit for the transformation may include a data unit for an intra mode and a data unit for an inter mode.

The transformation unit in the coding unit may be recursively split into smaller sized regions in a similar manner as the coding unit according to the tree structure. Thus, residues in the coding unit may be divided according to the transformation unit having the tree structure according to transformation depths.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. In other words, the transformation unit having the tree structure may be set according to the transformation depths.

Encoding information according to coding units corresponding to a coded depth requires not only information about the coded depth, but also about information related to prediction encoding and transformation. Accordingly, the coding unit determiner 120 not only determines a coded depth having a least encoding error, but also determines a partition type in a prediction unit, a prediction mode according to prediction units, and a size of a transformation unit for transformation.

Coding units according to a tree structure in an LCU and methods of determining a prediction unit or partition, and a transformation unit, according to exemplary embodiments, will be described in detail below with reference to FIGS. 7 through 19.

The coding unit determiner 120 may measure an encoding error of deeper coding units according to depths by using Rate-Distortion Optimization based on Lagrangian multipliers.

The outputter 130 outputs the image data of the LCU, which is encoded based on the at least one coded depth determined by the coding unit determiner 120, and information about the encoding mode according to the coded depth, in bitstreams.

The encoded image data may be obtained by encoding residues of an image.

The information about the encoding mode according to coded depth may include information about the coded depth, about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one LCU, and information about at least one encoding mode is determined for a coding unit of a coded depth, information about at least one encoding mode may be determined for one LCU. Also, a coded depth of the image data of the LCU may be different according to locations since the image data is hierarchically split according to depths, and thus information about the coded depth and the encoding mode may be set for the image data.

Accordingly, the outputter 130 may assign encoding information about a corresponding coded depth and an encoding mode to at least one of the coding unit, the prediction unit, and a minimum unit included in the LCU.

The minimum unit according to an exemplary embodiment is a square data unit obtained by splitting the SCU constituting the lowermost depth by 4. Alternatively, the minimum unit according to an exemplary embodiment may be a maximum square data unit that may be included in all of the coding units, prediction units, partition units, and transformation units included in the LCU.

For example, the encoding information output by the outputter 130 may be classified into encoding information according to deeper coding units, and encoding information according to prediction units. The encoding information according to the deeper coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit permitted with respect to a current video, and information about a minimum size of the transformation unit, may also be output through a header of a bitstream, a sequence parameter set, or a picture parameter set. The outputter 130 may encode and output offset parameters related to the offset adjustment technique described above with reference to FIGS. 1A through 7.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit with the current depth having a size of 2N×2N may include a maximum of 4 of the coding units with the lower depth.

Accordingly, the video encoding apparatus 100 may form the coding units having the tree structure by determining coding units having an optimum shape and an optimum size for each LCU, based on the size of the LCU and the maximum depth determined considering characteristics of the current picture. Also, since encoding may be performed on each LCU by using any one of various prediction modes and transformations, an optimum encoding mode may be determined considering characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit while considering a size of the image.

The video encoding apparatus 100 of FIG. 8 may perform an operation of the video encoding apparatus 10 described above with reference to FIG. 1A.

The coding unit determiner 120 may perform an operation of the offset parameter determiner 14 of the video encoding apparatus 10. An offset type, offset values according to categories, and an offset class may be determined with respect to each LCU.

The outputter 130 may perform an operation of the offset parameter encoder 16. Offset parameters determined with respect to each LCU may be output. Offset mergence information indicating whether to adopt offset parameters of an adjacent LCU of a current LCU as the offset parameters of the current LCU may be initially output. As an offset type, an off type, an edge type, or a band type may be output. An offset value may be output in an order of zero value information, sign information, and a remainder. With respect to the edge type, the sign information of the offset value may not be output.

If the offset mergence information of the current LCU allows adoption of the offset parameters of the adjacent LCU, the offset type and the offset values of the current LCU may not be output.

Figure 9:
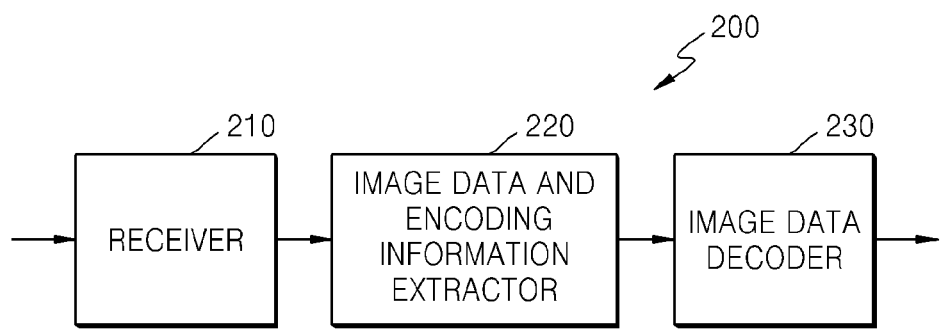
FIG. 9 is a block diagram of a video decoding apparatus based on coding units according to a tree structure, according to an exemplary embodiment.

FIG. 9 is a block diagram of a video decoding apparatus 200 based on coding units having a tree structure, according to an exemplary embodiment.

The video decoding apparatus 200 that involves video prediction based on coding units having a tree structure includes a receiver 210, an image data and encoding information extractor 220, and an image data decoder 230.

Definitions of various terms, such as a coding unit, a depth, a prediction unit, a transformation unit, and information about various encoding modes, for decoding operations of the video decoding apparatus 200 may be identical to those described with reference to FIG. 7 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each LCU, and outputs the extracted image data to the image data decoder 230. The image data and encoding information extractor 220 may extract information about a maximum size of a coding unit of a current picture, from a header about the current picture, a sequence parameter set, or a picture parameter set.

Also, the image data and encoding information extractor 220 extracts information about a coded depth and an encoding mode for the coding units having a tree structure according to each LCU, from the parsed bitstream. The extracted information about the coded depth and the encoding mode is output to the image data decoder 230. In other words, the image data in a bit stream is split into the LCU so that the image data decoder 230 may decode the image data for each LCU.

The information about the coded depth and the encoding mode according to the LCU may be set for information about at least one coding unit corresponding to the coded depth, and information about an encoding mode may include information about a partition type of a corresponding coding unit corresponding to the coded depth, about a prediction mode, and about a size of a transformation unit. Also, splitting information according to depths may be extracted as the information about the coded depth.

The information about the coded depth and the encoding mode according to each LCU extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each LCU. Accordingly, the video decoding apparatus 200 may reconstruct an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. If information about a coded depth and encoding mode of a corresponding LCU is recorded according to predetermined data units, the predetermined data units to which the same information about the coded depth and the encoding mode is assigned may be inferred to be the data units included in the same LCU.

The image data decoder 230 reconstructs the current picture by decoding the image data in each LCU based on the information about the coded depth and the encoding mode according to the LCUs. In other words, the image data decoder 230 may decode the encoded image data based on the extracted information about the partition type, the prediction mode, and the transformation unit for each coding unit from among the coding units having the tree structure included in each LCU. A decoding process may include a prediction including intra prediction and motion compensation, and an inverse transformation.

The image data decoder 230 may perform intra prediction or motion compensation according to a partition and a prediction mode of each coding unit, based on the information about the partition type and the prediction mode of the prediction unit of the coding unit according to coded depths.

In addition, the image data decoder 230 may read information about a transformation unit according to a tree structure for each coding unit so as to perform inverse transformation based on transformation units for each coding unit, for inverse transformation for each LCU. Via the inverse transformation, a pixel value of the space domain of the coding unit may be reconstructed.

The image data decoder 230 may determine a coded depth of a current LCU by using split information according to depths. If the split information indicates that image data is no longer split in the current depth, the current depth is a coded depth. Accordingly, the image data decoder 230 may decode encoded data in the current LCU by using the information about the partition type of the prediction unit, the prediction mode, and the size of the transformation unit for each coding unit corresponding to the coded depth.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. As such, the current coding unit may be decoded by obtaining the information about the encoding mode for each coding unit.

Also, the video decoding apparatus 200 of FIG. 9 may perform operations of the video decoding apparatus 20 described above with reference to FIG. 2A.

The image data and encoding information extractor 220 and the receiver 210 may perform operations of the offset parameter extractor 22 of the video decoding apparatus 20. The image data decoder 230 may perform operations of the offset determiner 24 and the offset adjuster 26 of the video decoding apparatus 20.

If only offset merge information is parsed from a bitstream without offset parameters of a current LCU, the image data and encoding information extractor 220 may reconstruct the offset parameters of the current LCU to be the same as those of at least one of adjacent LCUs. Based on the offset mergence information, an adjacent LCU having offset parameters to be referred to may be determined. If it is determined that the offset parameters of the current LCU are different from those of the adjacent LCUs based on the offset mergence information of the current LCU, which is parsed from the bitstream, the image data and encoding information extractor 220 may parse and reconstruct the offset parameters of the current LCU from the bitstream.

The image data and encoding information extractor 220 may parse offset parameters of each LCU from the bitstream. Based on the offset parameters, an offset type, offset values according to categories, and an offset class may be determined. If the offset type of the current LCU is an off type, offset adjustment on the current LCU may be terminated. If the offset type is an edge type, based on a category indicating an edge class indicating an edge direction of each of the reconstructed pixels, and an edge shape, a current offset value may be selected from among received offset values. If the offset type is a band type, a band to which each of the reconstructed pixels belongs is determined and an offset value corresponding to a current band may be selected from among the offset values.

The image data decoder 230 may generate a reconstructed pixel capable of minimizing an error between an original pixel and the reconstructed pixel, by adjusting a pixel value of the reconstructed pixel by a corresponding offset value. Offsets of reconstructed pixels of each LCU may be adjusted based on the parsed offset parameters.

Thus, the video decoding apparatus 200 may obtain information about at least one coding unit that generates the minimum encoding error when encoding is recursively performed for each LCU, and may use the information to decode the current picture. In other words, the coding units having the tree structure determined to be the optimum coding units in each LCU may be decoded.

Accordingly, even if image data has a high resolution and a large amount of data, the image data may be efficiently decoded and reconstructed by using a size of a coding unit and an encoding mode, which are adaptively determined according to characteristics of the image data, by using information about an optimum encoding mode received from an encoder.

Figure 10:
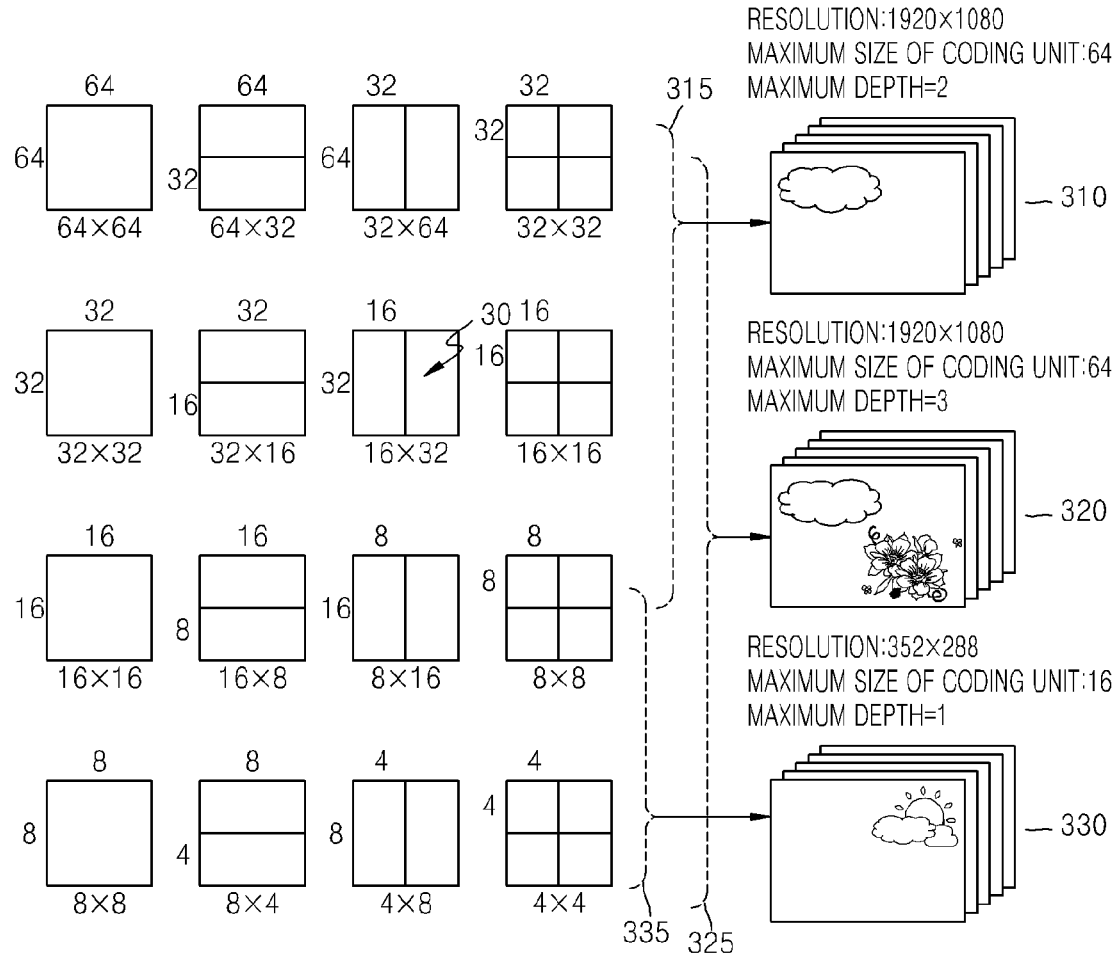
FIG. 10 is a diagram for describing a concept of coding units according to an exemplary embodiment.

FIG. 10 is a diagram for describing a concept of coding units according to an exemplary embodiment.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 10 denotes a total number of splits from an LCU to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having a higher resolution than the video data 330 may be 64.

Since the maximum depth of the video data 310 is 2, coding units 315 of the video data 310 may include an LCU having a long axis size of 64, and coding units having long axis sizes of 32 and 16 since depths are deepened to two layers by splitting the LCU twice. Since the maximum depth of the video data 330 is 1, coding units 335 of the video data 330 may include an LCU having a long axis size of 16, and coding units having a long axis size of 8 since depths are deepened to one layer by splitting the LCU once.

Since the maximum depth of the video data 320 is 3, coding units 325 of the video data 320 may include an LCU having a long axis size of 64, and coding units having long axis sizes of 32, 16, and 8 since the depths are deepened to 3 layers by splitting the LCU three times. As a depth deepens, detailed information may be precisely expressed.

Figure 11:
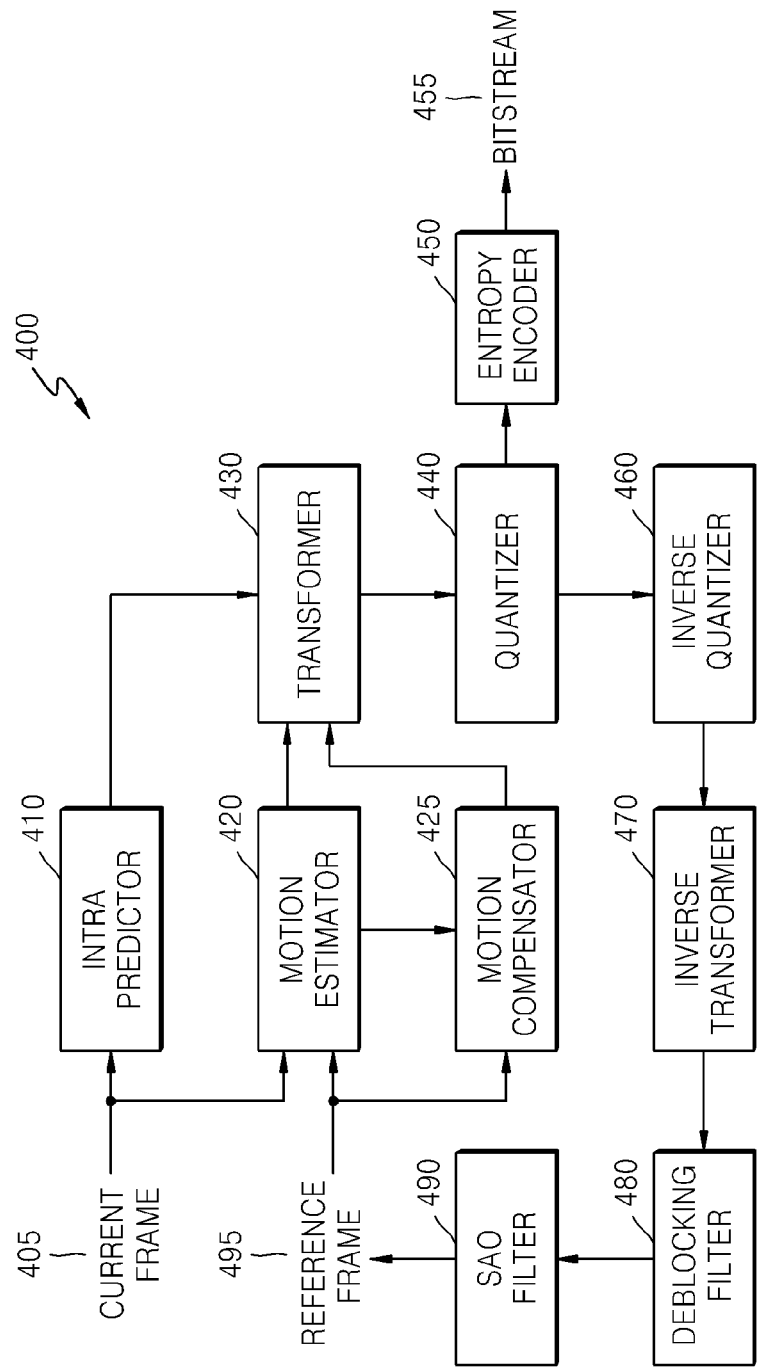
FIG. 11 is a block diagram of an image encoder based on coding units, according to an exemplary embodiment.

FIG. 11 is a block diagram of an image encoder 400 based on coding units, according to an exemplary embodiment.

The image encoder 400 performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 respectively perform inter estimation and motion compensation on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is reconstructed as data in the space domain through an inverse quantizer 460 and an inverse transformer 470, and the reconstructed data in the space domain is output as the reference frame 495 after being post-processed through a deblocking filter 480 and an SAO filter 490. The quantized transformation coefficient may be output as a bitstream 455 through an entropy encoder 450.

In order for the image encoder 400 to be applied in the video encoding apparatus 100, all elements of the image encoder 400, e.g., the intra predictor 410, the motion estimator 420, the motion compensator 425, the transformer 430, the quantizer 440, the entropy encoder 450, the inverse quantizer 460, the inverse transformer 470, the deblocking filter 480, and the SAO filter 490 perform operations based on each coding unit among coding units having a tree structure while considering the maximum depth of each LCU.

Specifically, the intra predictor 410, the motion estimator 420, and the motion compensator 425 determines partitions and a prediction mode of each coding unit from among the coding units having a tree structure while considering the maximum size and the maximum depth of a current LCU, and the transformer 430 determines the size of the transformation unit in each coding unit from among the coding units having a tree structure.

Specifically, when the motion estimator 420 performs the inter prediction using the long-term reference frame, the POC information of the long-term reference frame may be output as the long-term reference index. The entropy encoder 450 may encode and output the LSB information of the POC information of the long-term reference frame, as the long-term reference index. The LSB information of the POC information of the long-term reference frames for the prediction units of the current slice may be included in the slice header and then transmitted.

The image encoder 400 may classify pixels according to an edge type (or a band type) of each LCU of the reference frame 495, may determine an edge direction (or a start band position), and may determine an average error value of reconstructed pixels included in each category. With respect to each LCU, offset mergence information, an offset type, and offset values may be encoded and signaled.

Figure 12:
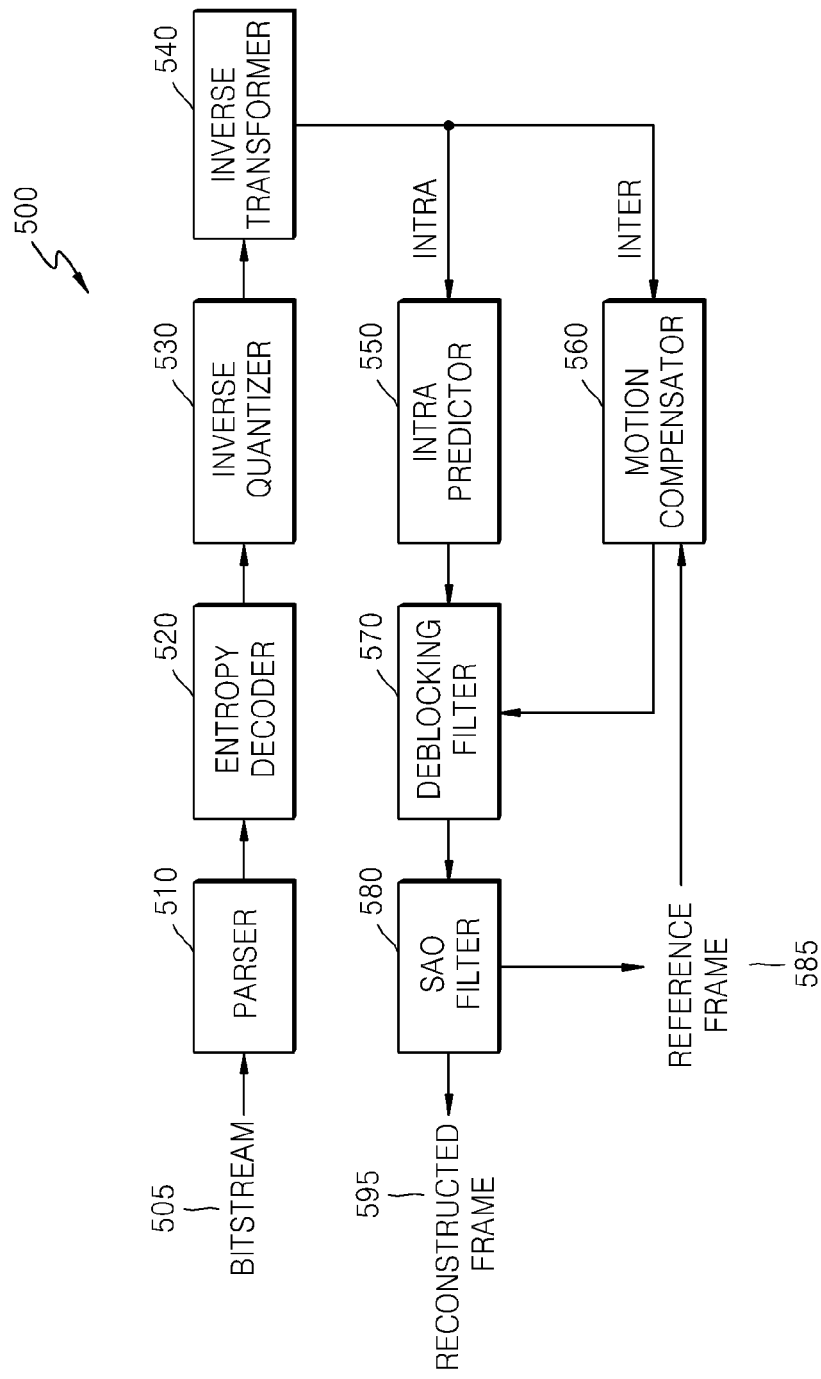
FIG. 12 is a block diagram of an image decoder based on coding units, according to an exemplary embodiment.

FIG. 12 is a block diagram of an image decoder 500 based on coding units, according to an exemplary embodiment.

A parser 510 parses encoded image data to be decoded and information about encoding required for decoding from a bitstream 505. The encoded image data is output as inverse quantized data through an entropy decoder 520 and an inverse quantizer 530, and the inverse quantized data is reconstructed to image data in the space domain through an inverse transformer 540.

An intra predictor 550 performs intra prediction on coding units in an intra mode with respect to the image data in the space domain, and a motion compensator 560 performs motion compensation on coding units in an inter mode by using a reference frame 585.

The image data in the space domain, after passing through the intra predictor 550 and the motion compensator 560, may be output as a reconstructed frame 595 after being post-processed through a deblocking filter 570 and an SAO filter 580. Also, the image data that is post-processed through the deblocking filter 570 and the SAO filter 580 may be output as the reference frame 585.

In order to decode the image data in the image data decoder 230 of the video decoding apparatus 200, the image decoder 500 may perform operations that are performed after the parser 510.

In order for the image decoder 500 to be applied in the video decoding apparatus 200, all elements of the image decoder 500, e.g., the parser 510, the entropy decoder 520, the inverse quantizer 530, the inverse transformer 540, the intra predictor 550, the motion compensator 560, the deblocking filter 570, and the SAO filter 580 perform operations based on coding units having a tree structure for each LCU.

Specifically, the intra predictor 550 and the motion compensator 560 perform operations based on partitions and a prediction mode for each of the coding units having a tree structure, and the inverse transformer 540 performs operations based on a size of a transformation unit for each coding unit.

The image decoder 500 may extract offset parameters of LCUs from a bitstream. Based on offset mergence information from among the offset parameters of a current LCU, offset parameters of the current LCU, which are the same as those of an adjacent LCU, may be reconstructed. By using an offset type and offset values from among the offset parameters of the current LCU, each of the reconstructed pixels of LCUs of the reconstructed frame 595 may be adjusted by an offset value corresponding to a category according to the edge type or the band type.

Figure 13:
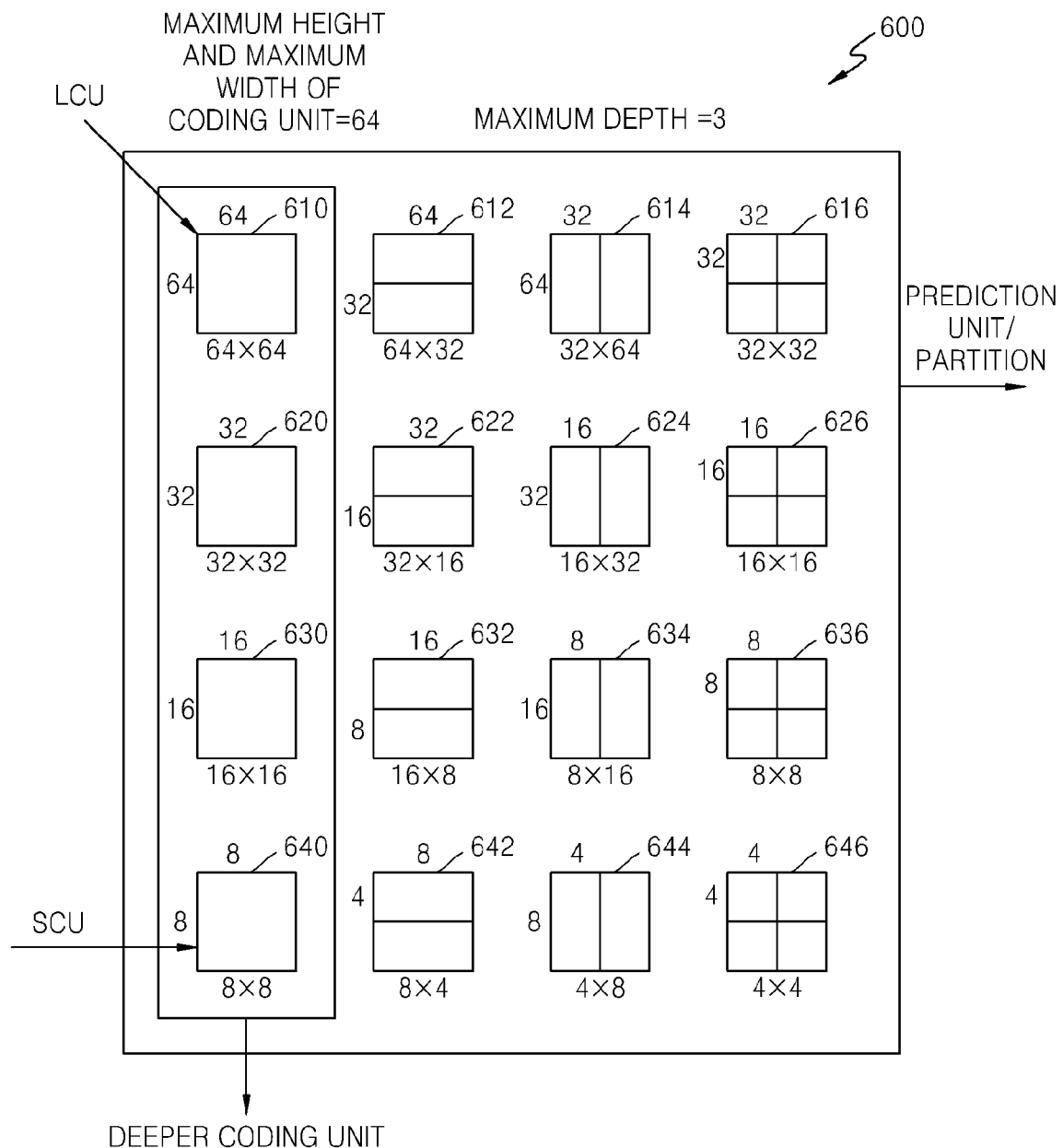
FIG. 13 is a diagram illustrating deeper coding units according to depths and partitions, according to an exemplary embodiment.

FIG. 13 is a diagram illustrating deeper coding units according to depths and partitions, according to an exemplary embodiment.

The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 4. In this case, the maximum depth refers to a total number of times the coding unit is split from the LCU to the SCU. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is an LCU in the hierarchical structure 600, wherein a depth is 0 and a size, e.g., a height by width, is 64×64. The depth deepens along the vertical axis, resulting in a coding unit 620 having a size of 32×32 and a depth of 1, a coding unit 630 having a size of 16×16 and a depth of 2, and a coding unit 640 having a size of 8×8 and a depth of 3. The coding unit 640 having a size of 4×4 and a depth of 3 is an SCU.

The prediction unit and the partitions of a coding unit are arranged along the horizontal axis according to each depth. In other words, if the coding unit 610 having a size of 64×64 and a depth of 0 is a prediction unit, the prediction unit may be split into partitions include in the encoding unit 610, e.g., a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, e.g., a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, e.g., a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, e.g., a partition having a size of 8×8 included in the coding unit 640, partitions 642 having a size of 8×4, partitions 644 having a size of 4×8, and partitions 646 having a size of 4×4.

In order to determine the at least one coded depth of the coding units constituting the LCU 610, the coding unit determiner 120 of the video encoding apparatus 100 performs encoding for coding units corresponding to each depth included in the LCU 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

Figure 14:
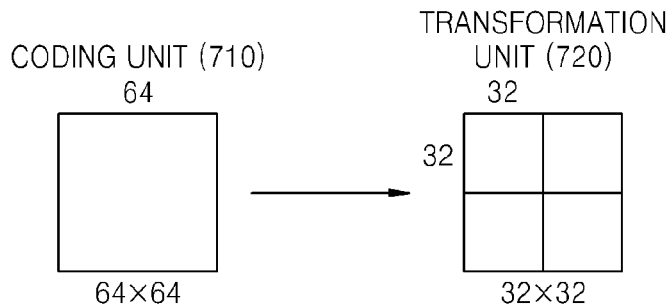
FIG. 14 is a diagram for describing a relationship between a coding unit and transformation units, according to an exemplary embodiment.

FIG. 14 is a diagram for describing a relationship between a coding unit 710 and transformation units 720, according to an exemplary embodiment.

The video encoding apparatus 100 or the video decoding apparatus 200 encodes or decodes an image according to coding units having sizes smaller than or equal to an LCU for each LCU. Sizes of transformation units for transformation during encoding may be selected based on data units that are not larger than a corresponding coding unit.

For example, in the video encoding apparatus 100 or the video decoding apparatus 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

Figure 15:
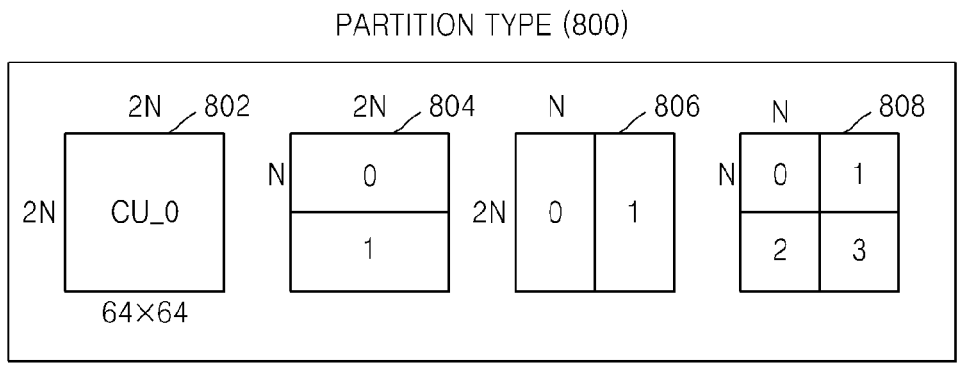
FIG. 15 is a diagram for describing encoding information of coding units corresponding to a coded depth, according to an exemplary embodiment.
Figure 15:
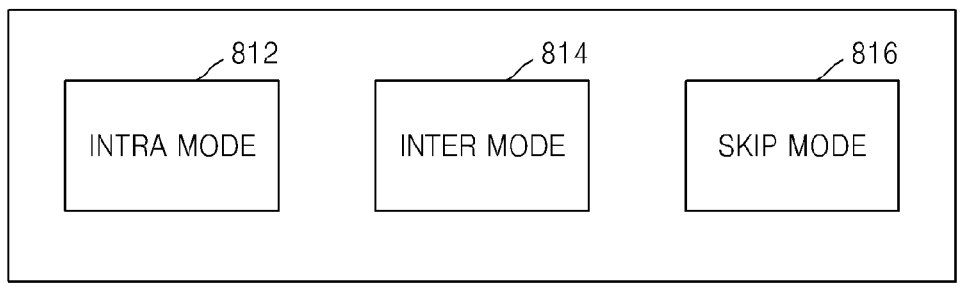
Figure 15:
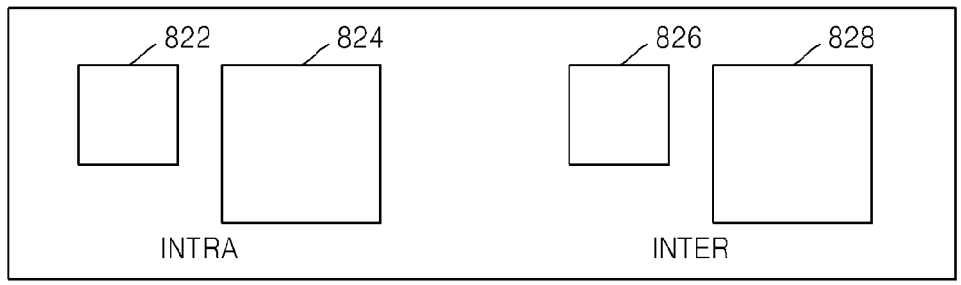

FIG. 15 is a diagram for describing encoding information of coding units corresponding to a coded depth, according to an exemplary embodiment.

The outputter 130 of the video encoding apparatus 100 may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N.

The information 810 indicates a prediction mode of each partition. For example, the information 810 may indicate a mode of prediction encoding performed on a partition indicated by the information 800, e.g., an intra mode 812, an inter mode 814, or a skip mode 816.

The information 820 indicates a transformation unit upon which transformation is to be based on when transformation is performed on a current coding unit. For example, the transformation unit may be a first intra transformation unit 822, a second intra transformation unit 824, a first inter transformation unit 826, or a second inter transformation unit 828.

The image data and encoding information extractor 220 of the video decoding apparatus 200 may extract and use the information 800, 810, and 820 for decoding, according to each deeper coding unit.

Figure 16:
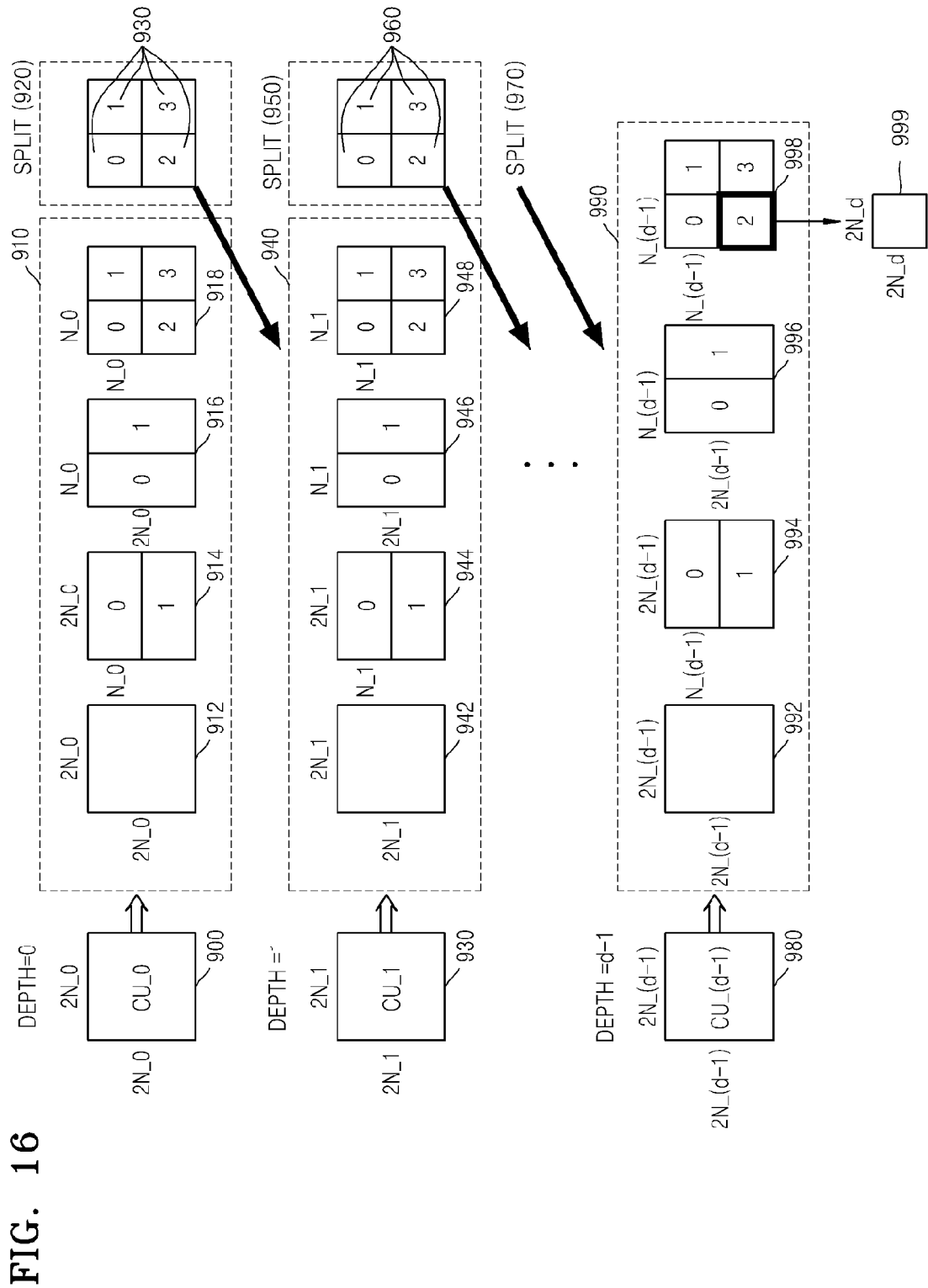
FIG. 16 is a diagram of deeper coding units according to depths, according to an exemplary embodiment.

FIG. 16 is a diagram of deeper coding units according to depths, according to an exemplary embodiment.

Split information may be used to indicate a change of a depth. The split information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 16 only illustrates the partition types 912 through 918 which are obtained by symmetrically splitting the prediction unit 910, but a partition type according to exemplary embodiments is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, a split operation according to each depth may be performed up to when a depth becomes d-1, and split information may be encoded as up to when a depth is one of 0 to d-2. In other words, when encoding is performed up to when the depth is d-1 after a coding unit corresponding to a depth of d-2 is split in operation 970, a prediction unit 990 for prediction encoding a coding unit 980 having a depth of d-1 and a size of 2N_(d-1)×2N_(d-1) may include partitions of a partition type 992 having a size of 2N_(d-1)×2N_(d-1), a partition type 994 having a size of 2N_(d-1)×N_(d-1), a partition type 996 having a size of N_(d-1)×2N_(d-1), and a partition type 998 having a size of N_(d-1)×N_(d-1).

Prediction encoding may be repeatedly performed on one partition having a size of 2N_(d-1)×2N_(d-1), two partitions having a size of 2N_(d-1)×N_(d-1), two partitions having a size of N_(d-1)×2N_(d-1), or four partitions having a size of N_(d-1)×N_(d-1) from among the partition types 992 through 998 to search for a partition type having a minimum encoding error.

Even when the partition type 998 has the minimum encoding error, since a maximum depth is d, a coding unit CU_(d-1) having a depth of d-1 is no longer split to a lower depth, and a coded depth for the coding units constituting a current LCU 900 is determined to be d-1 and a partition type of the current LCU 900 may be determined to be N_(d-1)×N_(d-1). Also, since the maximum depth is d and an SCU 980 having a lowermost depth of d-1 is no longer split to a lower depth, split information for the SCU 980 is not set.

A data unit 999 may be a 'minimum unit' for the current LCU. A minimum unit according to an exemplary embodiment may be a square data unit obtained by splitting an SCU 980 by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

Figure 17:
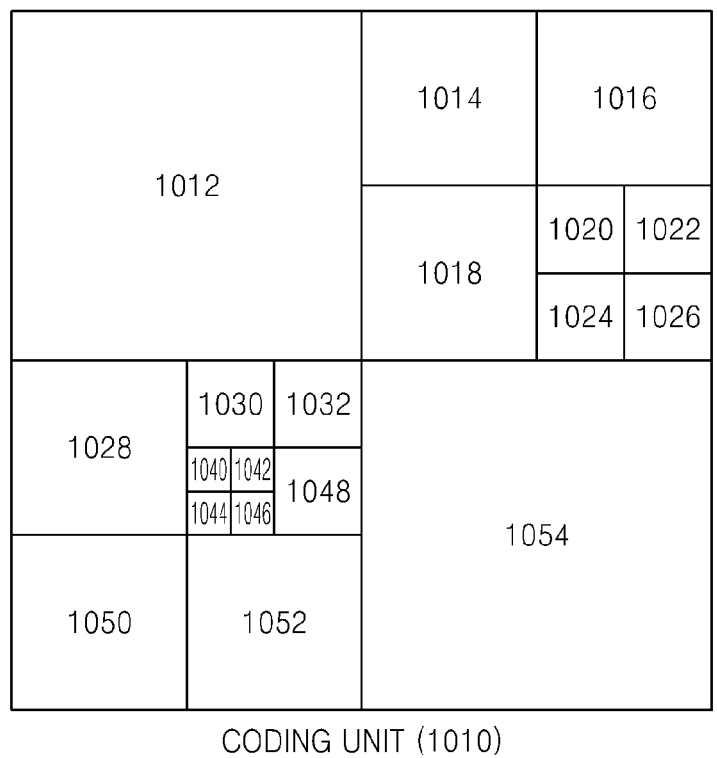
FIGS. 17 through 19 are diagrams for describing a relationship between coding units, prediction units, and transformation units, according to an exemplary embodiment.
Figure 18:
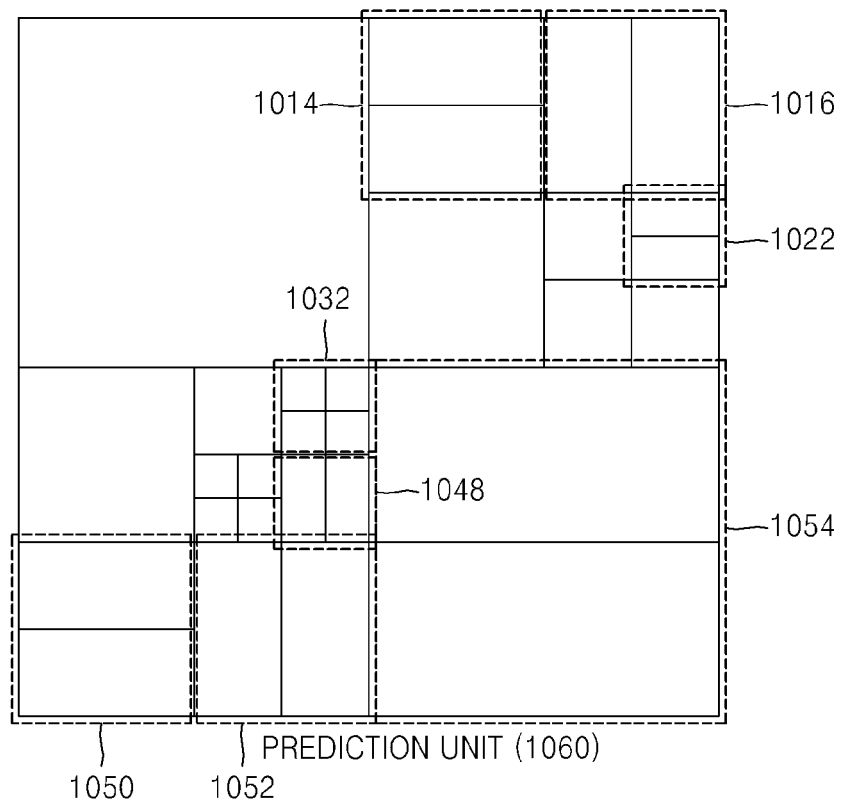
Figure 19:
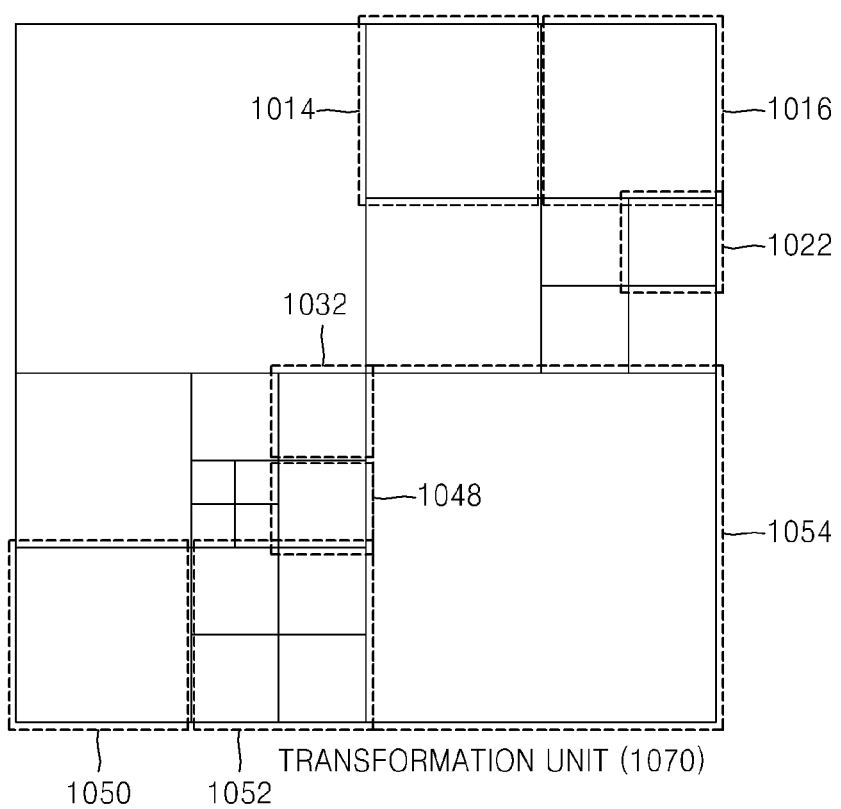

FIGS. 17 through 19 are diagrams for describing a relationship between coding units 1010, prediction units 1060, and transformation units 1070, according to an exemplary embodiment.

The coding units 1010 are coding units having a tree structure, corresponding to coded depths determined by the video encoding apparatus 100, in an LCU. The prediction units 1060 are partitions of prediction units of each of the coding units 1010, and the transformation units 1070 are transformation units of each of the coding units 1010.

When a depth of an LCU is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of the coding units having a hierarchical structure in each region of an LCU to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding and decoding apparatuses 100 and 200.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

TABLE 1

| Split Information 0 (Encoding on Coding Unit having Size of 2N × 2N and Current Depth of d) | | | | | Split Information 1 |
|---|---|---|---|---|---|
| Prediction Mode | Partition Type | | Size of Transform Unit | | Repeatedly Encode Coding Units having Lower Depth of d + 1 |
| Intra Inter Skip (Only 2N × 2N) | Symmetrical Partition Type | Asymmetrical Partition Type | Split Information 0 of Transform Unit | Split Information 1 of Transform Unit | |
| | 2N × 2N 2N × N N × 2N N × N | 2N × nU 2N × nD nL × 2N nR × 2N | 2N × 2N | N × N (Symmetrical Type) N/2 × N/2 (Asymmetrical Type) | |

The outputter 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in an LCU may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred to for predicting the current coding unit.

Figure 20:
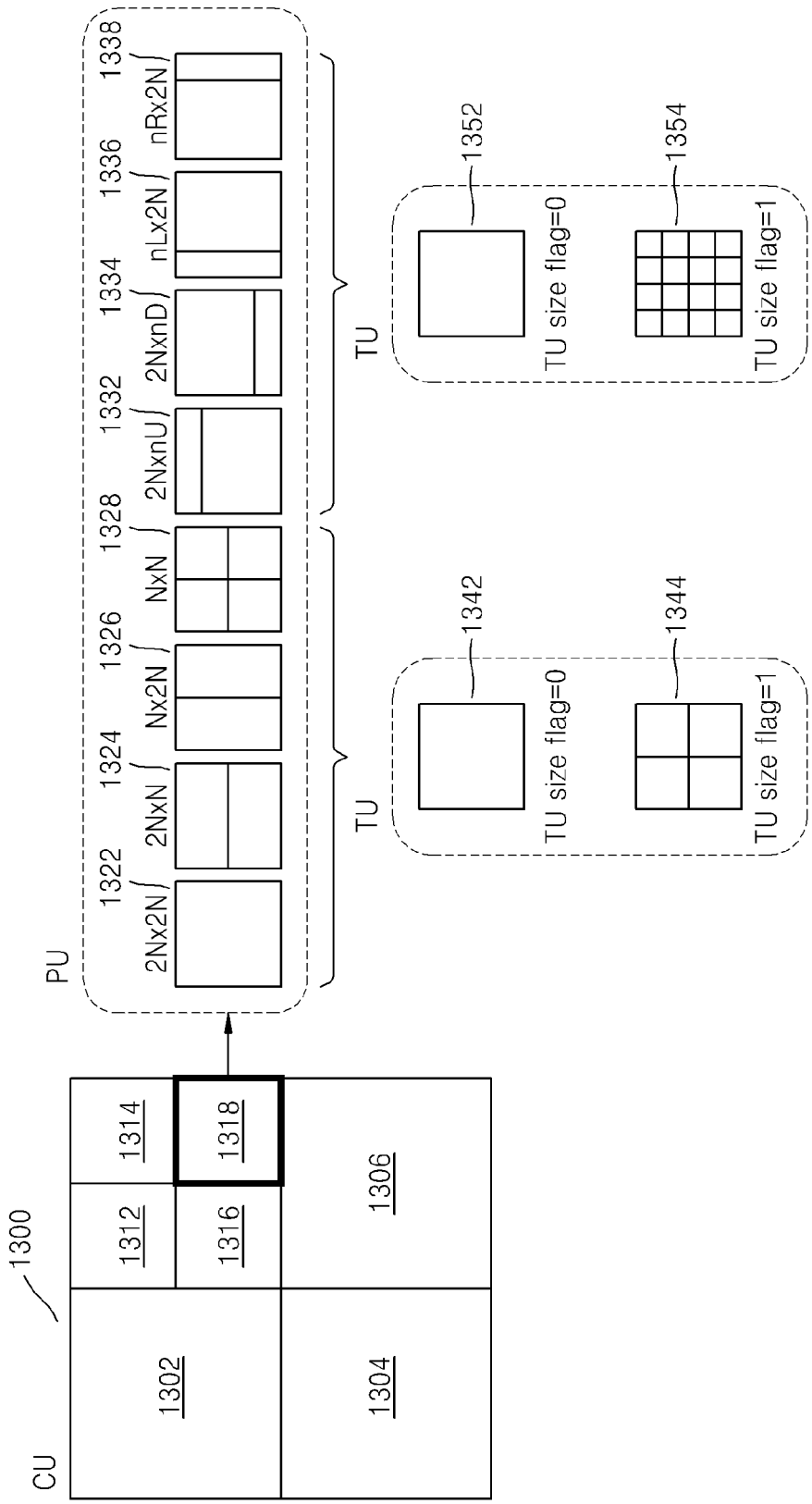
FIG. 20 is a diagram for describing a relationship between a coding unit, a prediction unit, and a transformation unit, according to encoding mode information of Table 1.

FIG. 20 is a diagram for describing a relationship between a coding unit, a prediction unit, and a transformation unit, according to encoding mode information of Table 1.

An LCU 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

Split information (TU size flag) of a transformation unit is a type of a transformation index. The size of the transformation unit corresponding to the transformation index may be changed according to a prediction unit type or partition type of the coding unit.

For example, when the partition type is set to be symmetrical, e.g., the partition type 1322, 1324, 1326, or 1328, a transformation unit 1342 having a size of 2N×2N is set if a TU size flag of a transformation unit is 0, and a transformation unit 1344 having a size of N×N is set if a TU size flag is 1.

When the partition type is set to be asymmetrical, e.g., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 20, the TU size flag may be a flag having a value or 0 or 1, but the TU size flag is not limited to 1 bit, and a transformation unit may be hierarchically split having a tree structure while the TU size flag increases from 0. Split information (TU size flag) of a transformation unit may be an example of a transformation index.

In this case, the size of a transformation unit that has been actually used may be expressed by using a TU size flag of a transformation unit according to an exemplary embodiment, together with a maximum size and minimum size of the transformation unit. The video encoding apparatus 100 is capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. The video decoding apparatus 200 may decode video by using the maximum transformation unit size information, the minimum transformation unit size information, and the maximum TU size flag.

For example, (a) if the size of a current coding unit is 64×64 and a maximum transformation unit size is 32×32, then the size of a transformation unit (a-1) may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, then the size of the transformation unit (b-1) may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$\text{CurrMinTuSize} = \max(\text{MinTransformSize}, \text{RootTuSize}/(2^{\text{MaxTransformSizeIndex}})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an exemplary embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$\text{RootTuSize} = \min(\text{MaxTransformSize}, \text{PUSize}) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$\text{RootTuSize} = \min(\text{MaxTransformSize}, \text{PartitionSize}) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example according to an exemplary embodiment and other exemplary embodiments are not limited thereto.

According to the video encoding method based on coding units having a tree structure as described with reference to FIGS. 8 through 20, image data of the space domain is encoded for each coding unit of a tree structure. According to the video decoding method based on coding units having a tree structure, decoding is performed for each LCU to reconstruct image data of the space domain. Thus, a picture and a video that is a picture sequence may be reconstructed. The reconstructed video may be reproduced by a reproducing apparatus, stored in a storage medium, or transmitted through a network (such as, for example, the Internet).

Also, offset parameters may be signaled with respect to each picture, each slice, each LCU, each of the coding units having a tree structure, each prediction unit of the coding units, or each transformation unit of the coding units. For example, pixel values of reconstructed pixels of each LCU may be adjusted by using offset values reconstructed based on received offset parameters, and thus an LCU having a minimized error between an original block and the LCU may be reconstructed.

The exemplary embodiments may be written as computer programs and may be implemented in general-use digital computers that execute the programs using a computer-readable recording medium. Examples of the computer-readable recording medium include magnetic storage media (e.g., ROM, floppy discs, hard discs, etc.) and optical recording media (e.g., CD-ROMs, or DVDs).

For convenience of description, the video encoding method according to adjustment of a sample offset, which is described above with reference to FIGS. 1A through 20, will be referred to as a 'video encoding method according to an exemplary embodiment'. In addition, the video decoding method according to adjustment of a sample offset, which is described above with reference to FIGS. 1A through 20, will be referred to as a 'video decoding method according to an exemplary embodiment'.

Also, a video encoding apparatus which may be implemented, for example, as the video encoding apparatus 10, the video encoding apparatus 100, or the image encoder 400, which is described above with reference to FIGS. 1A through 20, will be referred to as a 'video encoding apparatus according to an exemplary embodiment'. In addition, a video decoding apparatus which may be implemented, for example, as the video decoding apparatus 20, the video decoding apparatus 200, or the image decoder 500, which is described above with reference to FIGS. 1A through 20, will be referred to as a 'video decoding apparatus according to an exemplary embodiment'.

A computer-readable recording medium storing a program, e.g., a disc 26000, according to an exemplary embodiment will now be described in detail.

Figure 21:
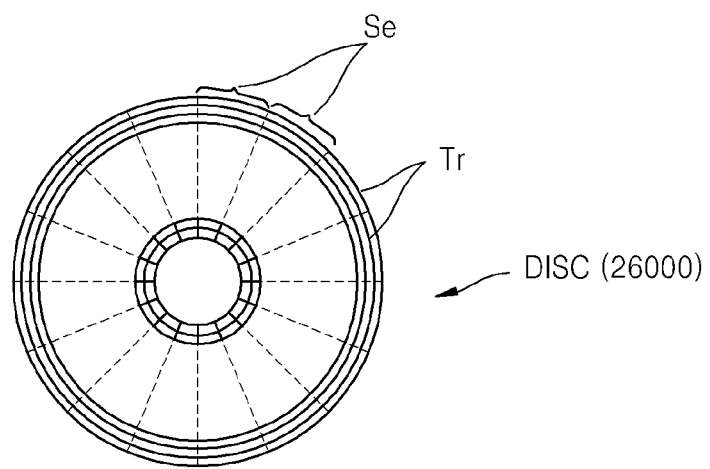
FIG. 21 is a diagram of a physical structure of a disc in which a program is stored, according to an exemplary embodiment.

FIG. 21 is a diagram of a physical structure of the disc 26000 in which a program is stored, according to an exemplary embodiment. The disc 26000, which is a storage medium, may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000, a program that executes the quantization parameter determination method, the video encoding method, and the video decoding method described above may be assigned and stored.

A computer system embodied using a storage medium that stores a program for executing the video encoding method and the video decoding method as described above will now be described with reference to FIG. 22.

Figure 22:
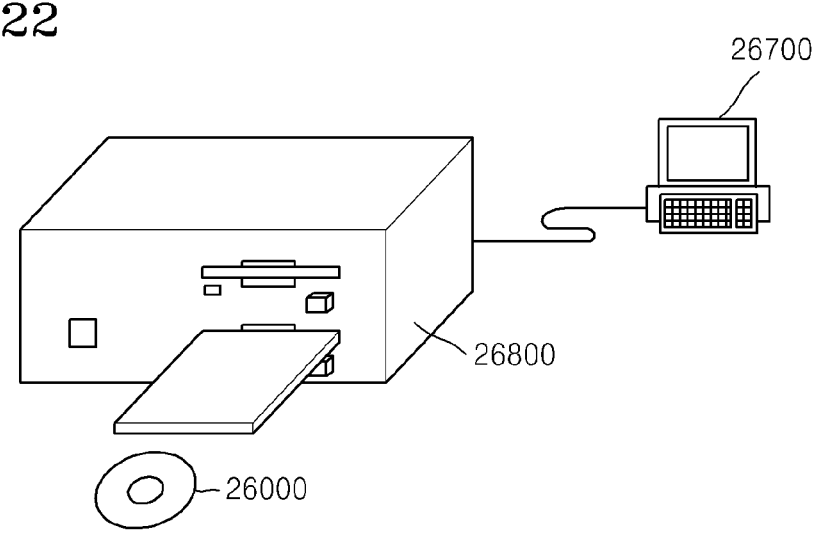
FIG. 22 is a diagram of a disc drive for recording and reading a program by using a disc.

FIG. 22 is a diagram of a disc drive 26800 for recording and reading a program by using the disc 26000. A computer system 26700 may store a program that executes at least one of a video encoding method and a video decoding method according to an exemplary embodiment, in the disc 26000 via the disc drive 26800. To run the program stored in the disc 26000 in the computer system 26700, the program may be read from the disc 26000 and be transmitted to the computer system 26700 by using the disc drive 26700.

The program that executes at least one of a video encoding method and a video decoding method according to an exemplary embodiment may be stored not only in the disc 26000 illustrated in FIG. 21 or 22 but also in a memory card, a ROM cassette, or a solid state drive (SSD).

A system to which the video encoding method and a video decoding method described above may be applied will be described below.

Figure 23:
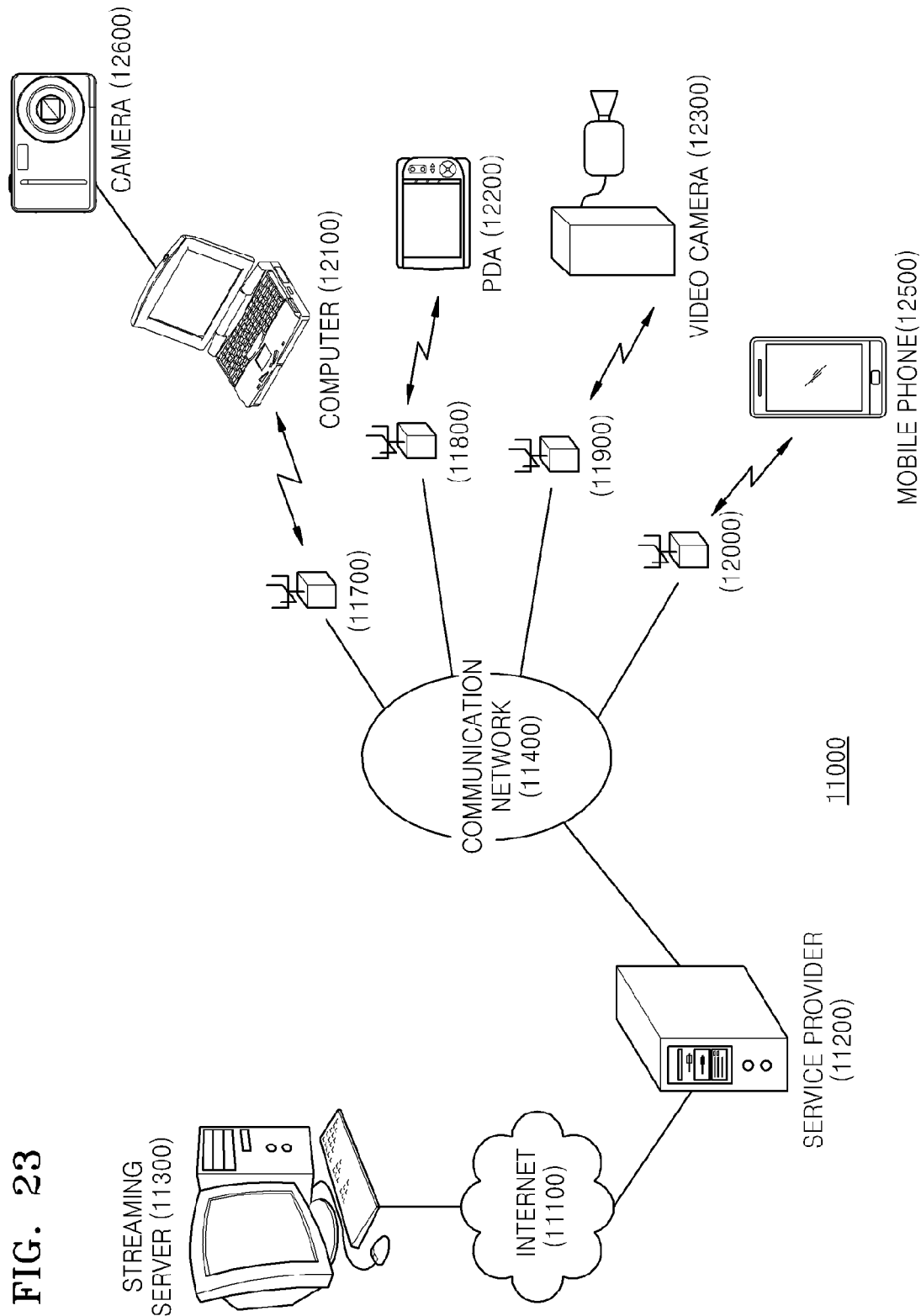
FIG. 23 is a diagram of an overall structure of a content supply system for providing a content distribution service.

FIG. 23 is a diagram of an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 may include a plurality of independent devices. For example, the plurality of independent devices, such as a computer 12100, a personal digital assistant (PDA) 12200, a video camera 12300, and a mobile phone 12500, may be connected to the Internet 11100 via an Internet service provider 11200, a communication network 11400, and the wireless base stations 11700, 11800, 11900, and 12000.

Figure 24:
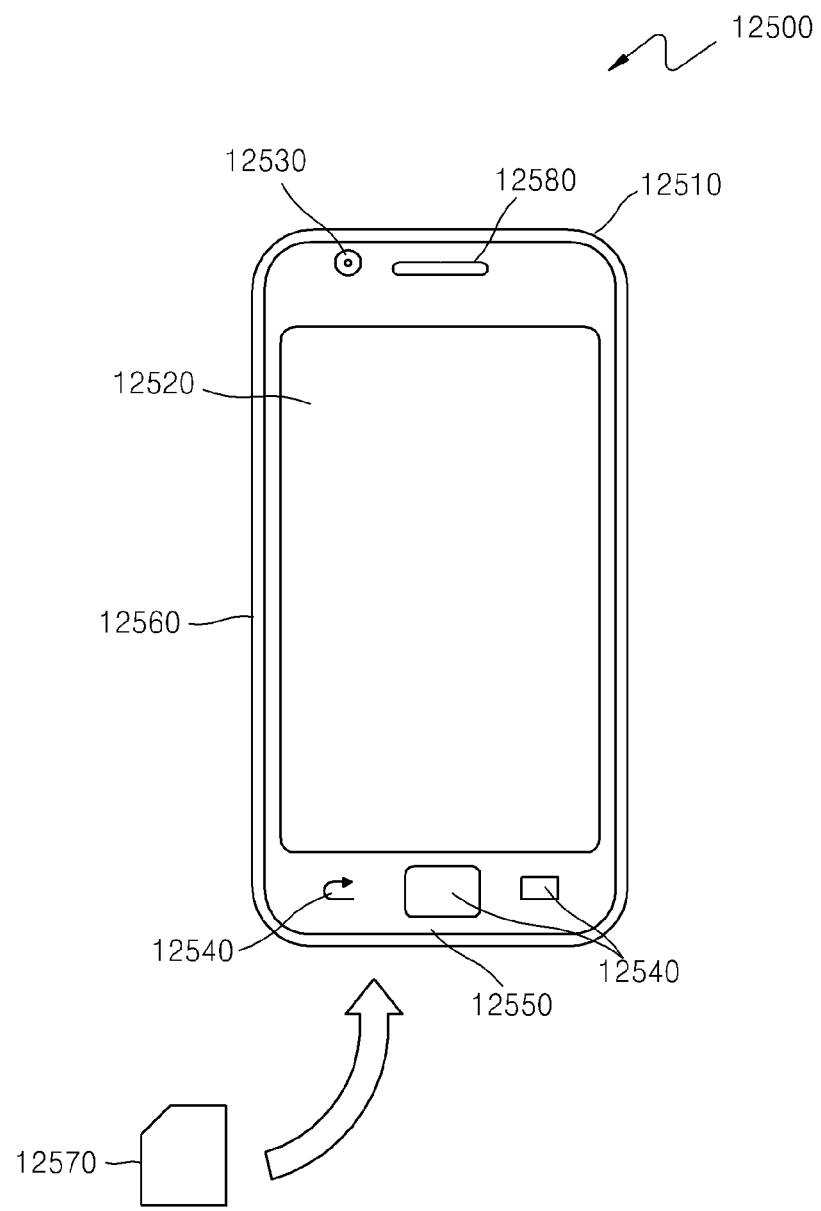
FIGS. 24 and 25 are diagrams respectively of an external structure and an internal structure of a mobile phone to which a video encoding method and a video decoding method are applied, according to an exemplary embodiment.

However, the content supply system 11000 is not limited to the configuration as illustrated in FIG. 24, and devices may be selectively connected thereto. For example, the plurality of independent devices may be directly connected to the communication network 11400, instead of being connected via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and a Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded using the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding video may be stored in a computer-readable recording medium, e.g., a CD-ROM disc, a floppy disc, a hard disc drive, an SSD, or a memory card, which may be accessible by the computer 12100.

If video data is captured by a camera built in the mobile phone 12500, the video data may be received from the mobile phone 12500.

The video data may also be encoded by a large scale integrated circuit (LSI) system installed in the video camera 12300, the mobile phone 12500, or the camera 12600.

The content supply system 11000 may encode content data recorded by a user using the video camera 12300, the camera 12600, the mobile phone 12500, or another imaging device, e.g., content recorded during a concert, and transmit the encoded content data to the streaming server 11300. The streaming server 11300 may transmit the encoded content data as a type of streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

Encoding and decoding operations of the plurality of independent devices included in the content supply system 11000 may be similar to those of a video encoding apparatus and a video decoding apparatus according to an exemplary embodiment.

The mobile phone 12500 included in the content supply system 11000 according to an exemplary embodiment will now be described in greater detail with reference to FIGS. 24 and 25.

FIG. 24 illustrates an external structure of the mobile phone 12500 configured to perform a video encoding method and a video decoding method are applied according to exemplary embodiments. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000 of FIG. 21, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of sound outputter, and a microphone 12550 for inputting voice and sound or another type of sound inputter. The mobile phone 12500 further includes the camera 12530, such as a charge-coupled device (CCD) camera, to capture video and still images. The mobile phone 12500 may further include a storage medium 12570 for storing encoded or decoded data, e.g., video or still images captured by the camera 12530, received via email, or obtained according to various other ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

Figure 25:
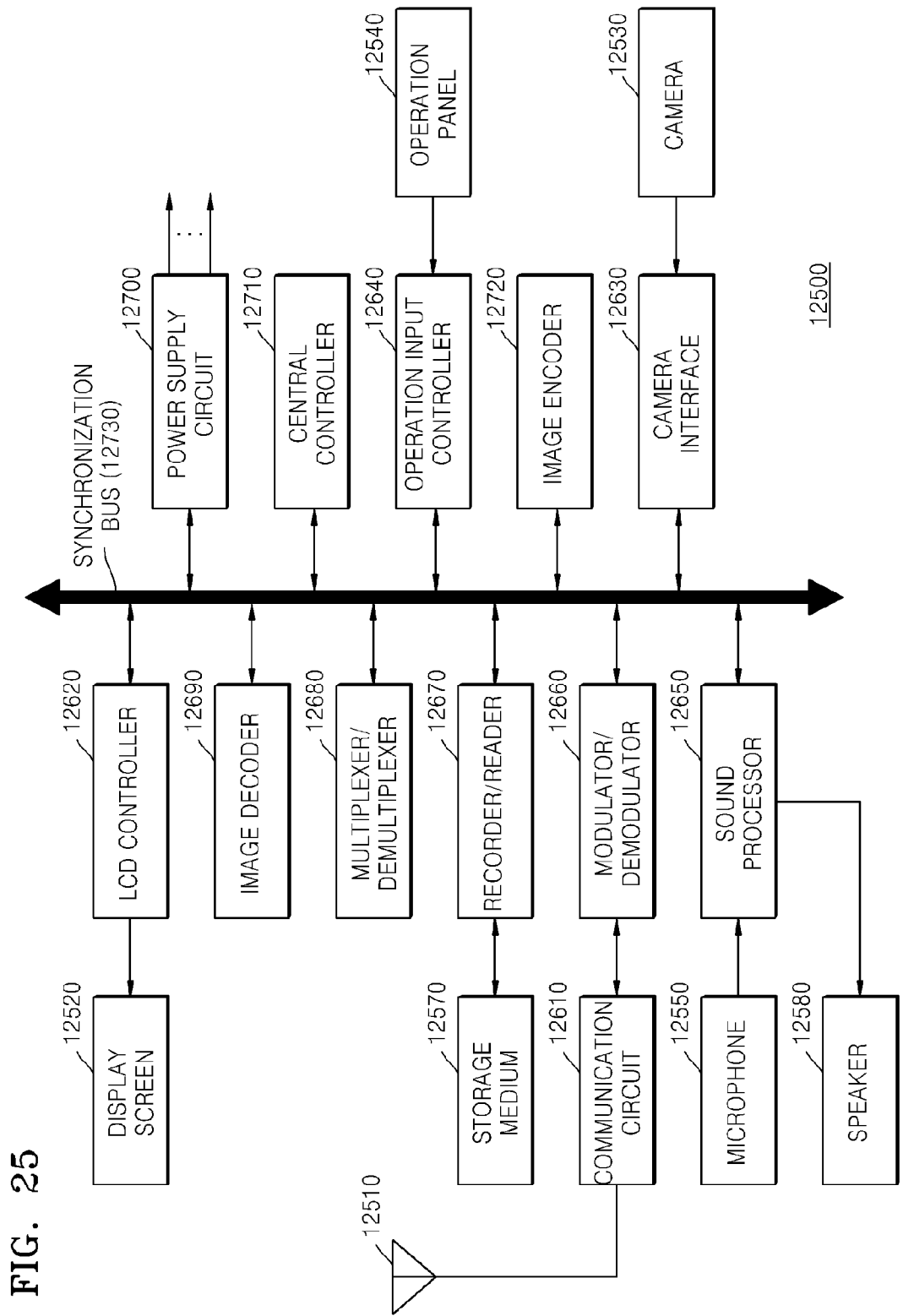

FIG. 25 illustrates an internal structure of the mobile phone 12500, according to an exemplary embodiment. To systemically control parts of the mobile phone 12500 including the display screen 12520 and the operation panel 12540, a power supply circuit 12700, an operation input controller 12640, an image encoder 12720, a camera interface 12630, an LCD controller 12620, an image decoder 12690, a multiplexer/demultiplexer 12680, a recorder/reader 12670, a modulator/demodulator 12660, and a sound processor 12650 are connected to a central controller 12710 via a synchronization bus 12730.

If a user operates a power button to thereby set the mobile phone 12500 from a 'power off' state to a 'power on' state, the power supply circuit 12700 supplies power to all the parts of the mobile phone 12500 from a battery pack, thereby setting the mobile phone 12500 in an operation mode.

The central controller 12710 includes a central processing unit (CPU), a ROM, and a RAM.

While the mobile phone 12500 transmits communication data to the outside, a digital signal is generated by the mobile phone 12500 under control of the central controller 12710. For example, the sound processor 12650 may generate a digital sound signal, the image encoder 12720 may generate a digital image signal, and text data of a message may be generated via the operation panel 12540 and the operation input controller 12640. When a digital signal is transmitted to the modulator/demodulator 12660 under control of the central controller 12710, the modulator/demodulator 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is transformed into a digital sound signal by the sound processor 12650, under control of the central controller 12710. The digital sound signal may be transformed into a transformation signal via the modulator/demodulator 12660 and the communication circuit 12610, and may be transmitted via the antenna 12510.

When a message, e.g., text message or email, is transmitted in a data communication mode, text data of the message is input via the operation panel 12540 and is transmitted to the central controller 12710 via the operation input controller 12640. Under control of the central controller 12710, the text data is transformed into a transmission signal via the modulator/demodulator 12660 and the communication circuit 12610 and is transmitted to the wireless base station 12000 via the antenna 12510.

To transmit image data in the data communication mode, image data captured by the camera 12530 is provided to the image encoder 12720 via the camera interface 12630. The captured image data may be directly displayed on the display screen 12520 via the camera interface 12630 and the LCD controller 12620.

A structure of the image encoder 12720 may correspond to that of the above-described video encoding method according to an exemplary embodiment. The image encoder 12720 may transform the image data received from the camera 12530 into compressed and encoded image data based on the above-described video encoding method according to an exemplary embodiment, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoder 12720, together with the sound data received from the sound processor 12650. A result of multiplexing the data may be transformed into a transmission signal via the modulator/demodulator 12660 and the communication circuit 12610, and may then be transmitted via the antenna 12510.

While the mobile phone 12500 receives communication data from the outside, frequency recovery and ADC are performed on a signal received via the antenna 12510 to transform the signal into a digital signal. The modulator/demodulator 12660 modulates a frequency band of the digital signal. The frequency-band modulated digital signal is transmitted to the video decoding unit 12690, the sound processor 12650, or the LCD controller 12620, according to the type of the digital signal.

In the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulator/demodulator 12660 and the sound processor 12650, and the analog sound signal is output via the speaker 12580, under control of the central controller 12710.

When in the data communication mode, data of a video file accessed, for example, at an Internet website is received, a signal received from the wireless base station 12000 via the antenna 12510 is output as multiplexed data via the modulator/demodulator 12660, and the multiplexed data is transmitted to the multiplexer/demultiplexer 12680.

To decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoding unit 12690 and the sound processor 12650, respectively.

A structure of the image decoder 12690 may correspond to that of the above-described video decoding apparatus according to an exemplary embodiment. The image decoder 12690 may decode the encoded video data to obtain reconstructed video data and provide the reconstructed video data to the display screen 12520 via the LCD controller 12620, by using the above-described video decoding method according to an exemplary embodiment.

Thus, for example, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both a video encoding apparatus and a video decoding apparatus according to an exemplary embodiment, may be a transceiving terminal including only the video encoding apparatus, or may be a transceiving terminal including only the video decoding apparatus.

Figure 26:
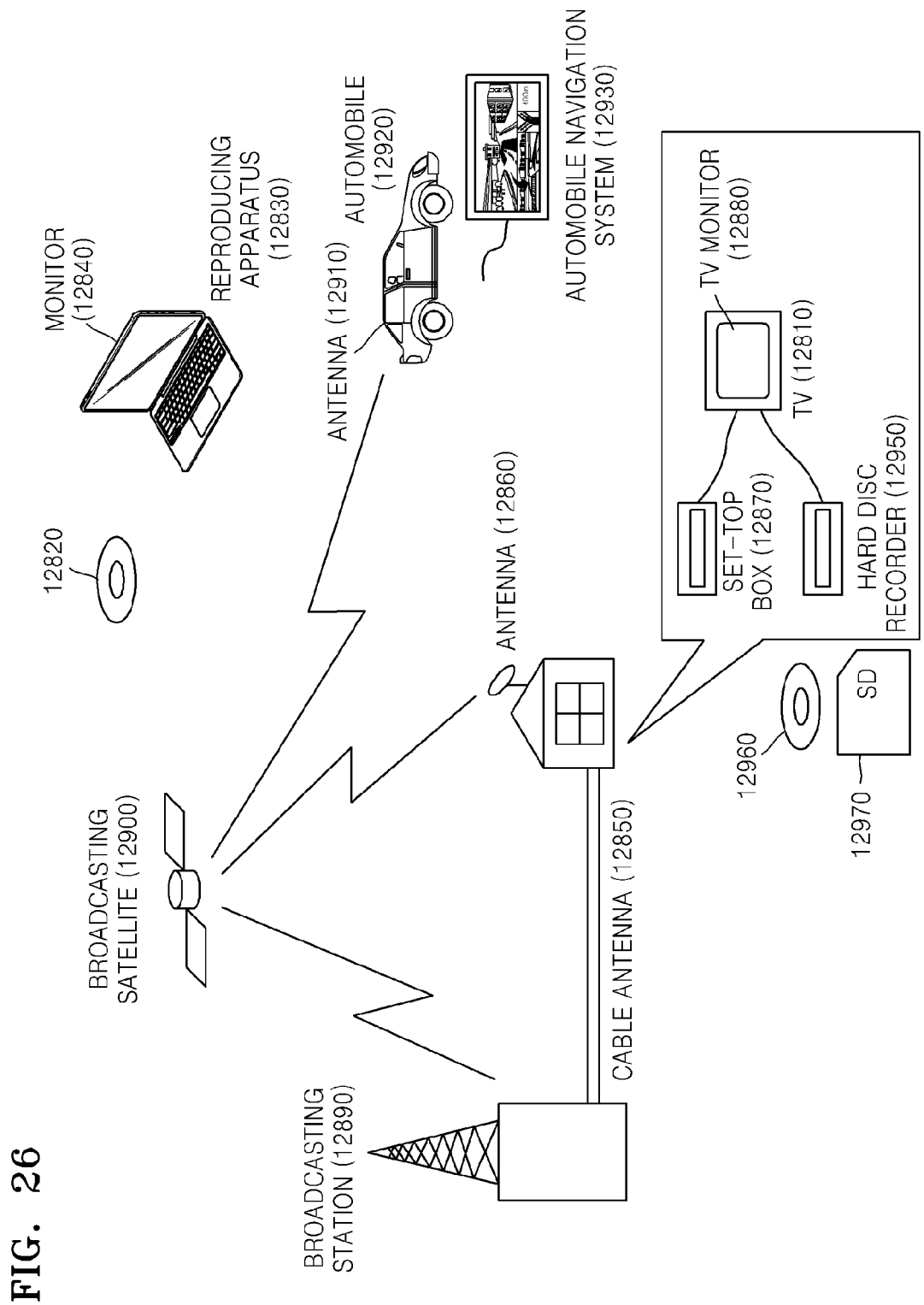
FIG. 26 is a diagram of a digital broadcast system to which a communication system is applied, according to an exemplary embodiment.

A communication system according to an exemplary embodiment is not limited to the communication system described above with reference to FIG. 24. For example, FIG. 26 illustrates a digital broadcasting system employing a communication system, according to an exemplary embodiment. The digital broadcasting system of FIG. 26 may receive a digital broadcast transmitted via a satellite or a terrestrial network by using a video encoding apparatus and a video decoding apparatus according to an exemplary embodiment.

Specifically, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When a video decoding apparatus according to an exemplary embodiment is implemented in a reproducing apparatus 12830, the reproducing apparatus 12830 may parse and decode an encoded video stream recorded on a storage medium 12820, such as a disc or a memory card, to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, a video decoding apparatus according to an exemplary embodiment may be installed. Data output from the set-top box 12870 may also be reproduced on a TV monitor 12880.

As another example, a video decoding apparatus according to an exemplary embodiment may be installed in the TV receiver 12810 instead of the set-top box 12870.

An automobile 12920 that has an appropriate antenna 12910 may receive a signal transmitted from the satellite 12900 or the wireless base station 11700 of FIG. 23. A decoded video may be reproduced on a display screen of an automobile navigation system 12930 installed in the automobile 12920.

A video signal may be encoded by a video encoding apparatus according to an exemplary embodiment and may then be stored in a storage medium. Specifically, an image signal may be stored in a DVD disc 12960 by a DVD recorder or may be stored in a hard disc by a hard disc recorder 12950. As another example, the video signal may be stored in an SD card 12970. If the hard disc recorder 12950 includes a video decoding apparatus according to an exemplary embodiment, a video signal recorded on the DVD disc 12960, the SD card 12970, or another storage medium may be reproduced on the TV monitor 12880.

The automobile navigation system 12930 may not include the camera 12530 of FIG. 24, and the camera interface 12630 and the image encoder 12720 of FIG. 25. For example, the computer 12100 and the TV receiver 12810 may not include the camera 12530, the camera interface 12630, and the image encoder 12720.

Figure 27:
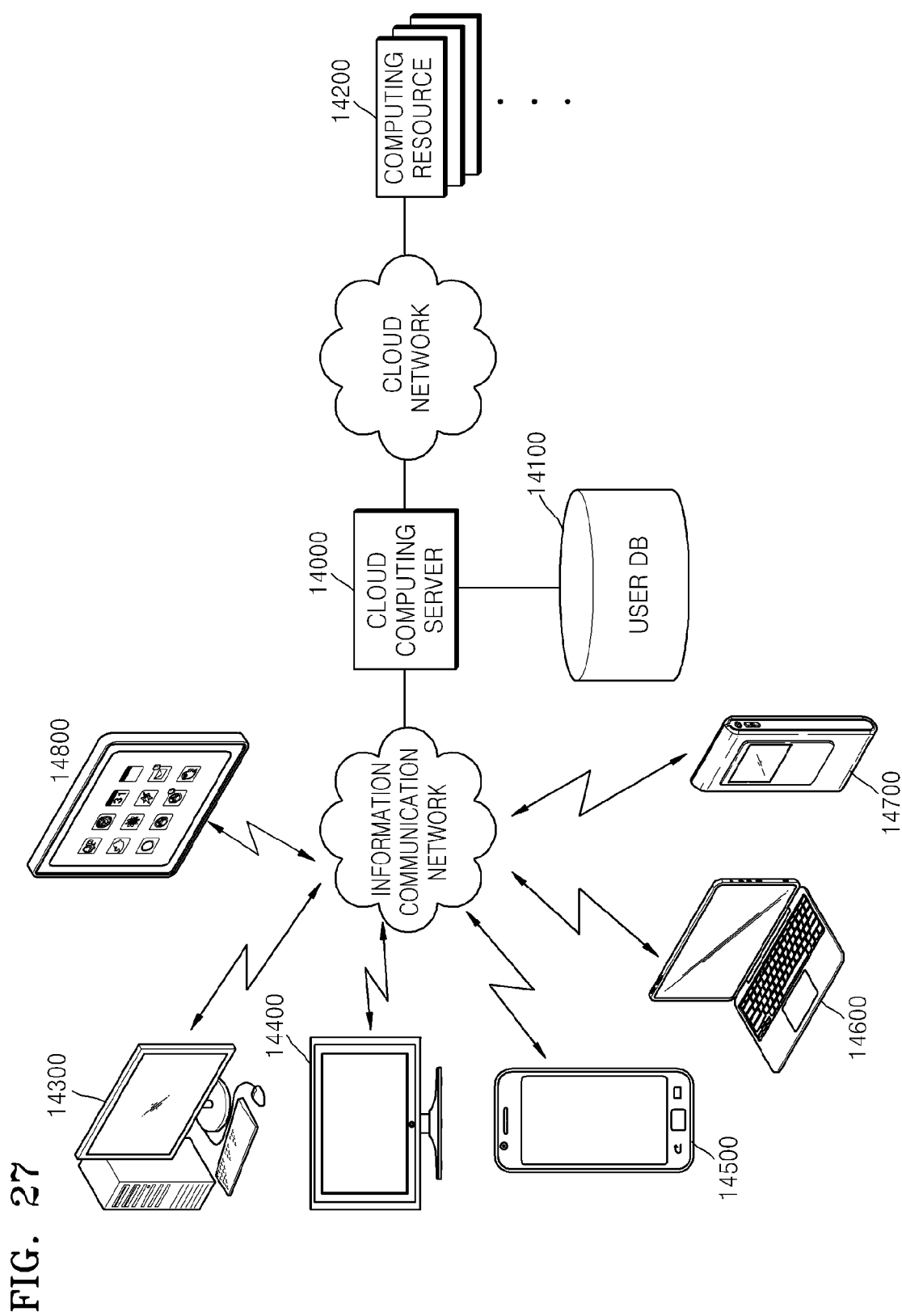
FIG. 27 is a diagram illustrating a network structure of a cloud computing system using a video encoding apparatus and a video decoding apparatus, according to an exemplary embodiment.

FIG. 27 is a diagram illustrating a network structure of a cloud computing system using a video encoding apparatus and a video decoding apparatus, according to an exemplary embodiment.

The cloud computing system may include a cloud computing server 14000, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security, into his or her own terminal in order to use the computing resources, and may instead select and use desired services from among services in a virtual space generated through the virtualization technology, at a desired point in time.

A user terminal of a specified service user is connected to the cloud computing server 14000 via a data communication network including, for example, the Internet and a mobile telecommunication network. User terminals may be provided with cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14000 may combine the plurality of computing resources 14200 distributed in a cloud network and provide user terminals with a result of combining. The plurality of computing resources 14200 may include various data services, and may include data uploaded from user terminals. As described above, the cloud computing server 14000 may provide user terminals with desired services by combining video databases distributed in different regions according to the virtualization technology.

User information about users who have subscribed for a cloud computing service is stored in the user DB 14100. The user information may include login information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce the video service is received from the smart phone 14500, the cloud computing server 14000 searches for and reproduces the video service, based on the user DB 14100. When the smart phone 14500 receives a video data stream from the cloud computing server 14000, a process of reproducing video by decoding the video data stream is similar to an operation of the mobile phone 12500 described above with reference to FIG. 24.

The cloud computing server 14000 may refer to a reproduction history of a desired video service, stored in the user DB 14100. For example, the cloud computing server 14000 receives a request to reproduce a video stored in the user DB 14100, from a user terminal. If the video was being reproduced, then a method of streaming the video, performed by the cloud computing server 14000, may vary according to the request from the user terminal, e.g., according to whether the video will be reproduced, starting from a starting point thereof or a pausing point thereof. For example, if the user terminal requests to reproduce the video, starting from the starting point thereof, the cloud computing server 14000 transmits streaming data of the video starting from a first frame thereof to the user terminal. Alternatively, if the user terminal requests to reproduce the video starting from the pausing point thereof, the cloud computing server 14000 transmits streaming data of the video starting from a frame corresponding to the pausing point, to the user terminal.

In this case, the user terminal may include a video decoding apparatus as described above with reference to FIGS. 1A through 20. As another example, the user terminal may include a video encoding apparatus as described above with reference to FIGS. 1A through 20. Alternatively, the user terminal may include both the video decoding apparatus and the video encoding apparatus as described above with reference to FIGS. 1A through 20.

Various applications of a video encoding method, a video decoding method, a video encoding apparatus, and a video decoding apparatus according to exemplary embodiments described above with reference to FIGS. 1A through 20 have been described above with reference to FIGS. 21 to 27. However, methods of storing the video encoding method and the video decoding method in a storage medium or methods of implementing the video encoding apparatus and the video decoding apparatus in a device, according to various exemplary embodiments, are not limited to the exemplary embodiments described above with reference to FIGS. 21 to 27.

While the exemplary embodiments have been particularly shown and described with reference to certain exemplary embodiments thereof, it will be understood by one of ordinary skill in the art that various changes in form and details may be made therein without departing from the spirit and scope of the exemplary embodiments as defined by the following claims. The exemplary embodiments should be considered in a descriptive sense only and not for purposes of limitation. Therefore, the scope of the exemplary embodiments is defined not by the detailed description of the exemplary embodiments but by the following claims, and all differences within the scope will be construed as being included in the exemplary embodiments.

The invention claimed is:

1. A video decoding method comprising:
   determining whether an offset parameter of a current block is determined according to an offset parameter of a left block;
   in response to determining that the offset parameter of the current block is determined according to the offset parameter of the left block, determining the offset parameter of the current block to be identical to the offset parameter of the left block;
   in response to determining that the offset parameter of the current block is not determined according to the offset parameter of the left block, determining whether the offset parameter of the current block is determined according to an offset parameter of an upper block;
   in response to determining that the offset parameter of the current block is determined according to the offset parameter of the upper block, determining the offset parameter of the current block to be identical to the offset parameter of the upper block;
   in response to determining that the offset parameter of the current block is not determined according to the offset parameter of the upper block, obtaining, from a bitstream, offset type information of a luma component of the current block and offset type information of a chroma component of the current block; and
   compensating for samples of the current block by using the offset parameter of the current block,
   wherein the compensating for the samples of the current block by using the offset parameter of the current block comprises:
   when the offset type information of the luma component of the current block indicates an edge offset type, obtaining, from the bitstream, absolute values of luma offset values and a luma edge class indicating a direction of a luma edge of the current block and compensating for luma samples of the current block by using the absolute values of the luma offset values and the luma edge class;

when the offset type information of the chroma component of the current block indicates the edge offset type, obtaining, from the bitstream, absolute values of chroma offset values and a chroma edge class indicating a direction of a chroma edge of the current block and compensating for chroma samples of the current block by using the absolute values of the chroma offset values and the chroma edge class;

when the offset type information of the luma component of the current block indicates a band offset type, obtaining, from the bitstream, the absolute values of the luma offset values and signs of the luma offset values indicating whether the luma offset values are positive or negative, and compensating for the luma samples of the current block by using the absolute values of the luma offset values and the signs of luma offset values; and when the offset type information of the chroma component of the current block indicates the band offset type, obtaining, from the bitstream, the absolute values of the chroma offset values and signs of the chroma offset values indicating whether the chroma offset values are positive or negative, and compensating for the chroma samples of the current block by using the absolute values of the chroma offset values and the signs of chroma offset values.

* * * * *